(12) United States Patent
Levy et al.

(10) Patent No.: US 11,748,428 B2
(45) Date of Patent: *Sep. 5, 2023

(54) MULTIMEDIA DIGITAL COLLAGE PROFILE USING THEMES FOR SEARCHING AND MATCHING OF A PERSON, PLACE OR IDEA

(71) Applicant: KINDRA CONNECT, INC., Venice, CA (US)

(72) Inventors: Gina Levy, Venice, CA (US); Austin Neill, Dana Point, CA (US); Drew McAuliffe, Los Angeles, CA (US); Brandon Rukin, Beachwood, OH (US)

(73) Assignee: Kindra Connect, Inc., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,160

(22) Filed: Sep. 20, 2021

(65) Prior Publication Data
US 2022/0035881 A1 Feb. 3, 2022

Related U.S. Application Data

(63) Continuation of application No. 16/360,855, filed on Mar. 21, 2019, now Pat. No. 11,126,677.
(Continued)

(51) Int. Cl.
*G06F 16/9536* (2019.01)
*G06Q 50/00* (2012.01)
(Continued)

(52) U.S. Cl.
CPC ...... *G06F 16/9536* (2019.01); *G06F 16/4393* (2019.01); *G06F 16/9535* (2019.01); *G06Q 50/01* (2013.01)

(58) Field of Classification Search
None
See application file for complete search history.

(56) References Cited

U.S. PATENT DOCUMENTS 11,126,677 B2 * 9/2021 Levy .................. G06F 16/4393
2013/0079128 A1 3/2013 Thomas et al.
(Continued)

*Primary Examiner* — Kim T Nguyen
(74) *Attorney, Agent, or Firm* — Perkins Coie LLP

(57) ABSTRACT

One embodiment provides a system and method for matching including a user interface digital collage for multimedia sharing built using themes paired with theme-based search functionality. This system and method can be used for searching, introducing, matching and exploring people (i.e. for dating, friendship, networking, project collaboration or employment), companies (i.e., for job placement), places (i.e., real estate rentals or sales) or ideas, where the themes are attributes of the person, company, place or idea. Another embodiment integrates this system and method with events and gatherings (e.g., parties, job fairs or open houses for sales or rentals of real estate), enabling connection and exploration of users' digital collages based on which users are attending or having particular gathering or events. In some embodiments the event can be real including for example, concerts, sporting events, theater, or virtual including, for example, online meetings, presentations, or group chats. An additional embodiment brings together in a thread or feed the most liked or popular multimedia content created by users for their digital collages, enabling connections based on exploration of that particular content or related content.

19 Claims, 28 Drawing Sheets

Related U.S. Application Data

(60) Provisional application No. 62/647,574, filed on Mar. 23, 2018.

(51) Int. Cl.
*G06F 16/438* (2019.01)
*G06F 16/9535* (2019.01)

(56) References Cited

U.S. PATENT DOCUMENTS

| | | |
|---|---|---|
| 2014/0310713 A1 | 10/2014 | Kaldor |
| 2015/0070150 A1 | 3/2015 | Levesque et al. |
| 2016/0180259 A1 | 6/2016 | Marianko et al. |
| 2018/0240157 A1 | 8/2018 | Gopalakrishnan |
| 2019/0102972 A1 | 4/2019 | Watkins |
| 2019/0294646 A1* | 9/2019 | Levy ............... G06F 16/9535 |
| 2020/0285799 A1 | 9/2020 | Young |
| 2022/0006661 A1* | 1/2022 | Rathod ............ H04L 12/1818 |
| 2022/0035881 A1* | 2/2022 | Levy ............... G06F 16/4393 |
| 2022/0100803 A1* | 3/2022 | Pineiro ............ G06F 21/32 |

\* cited by examiner

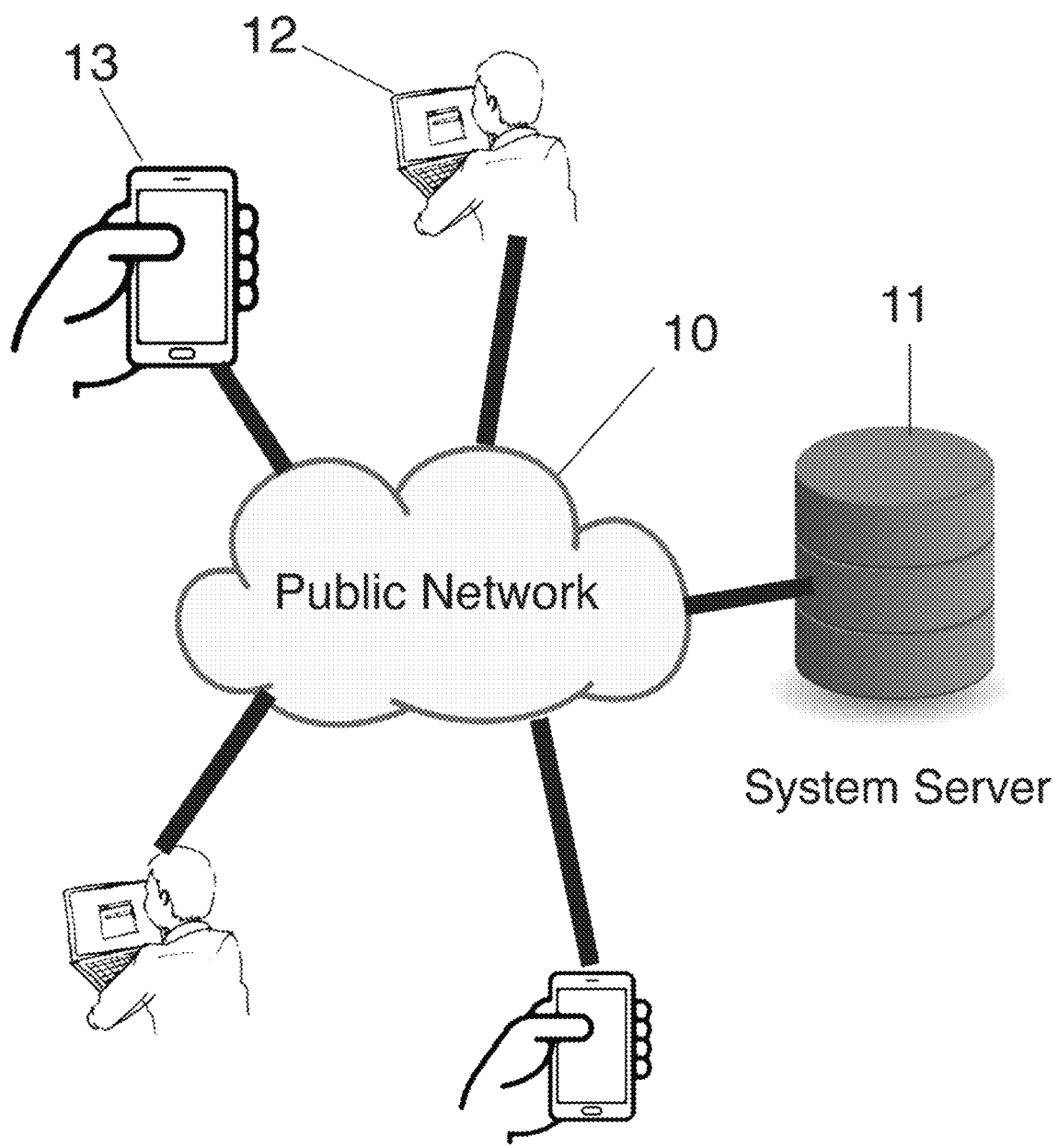

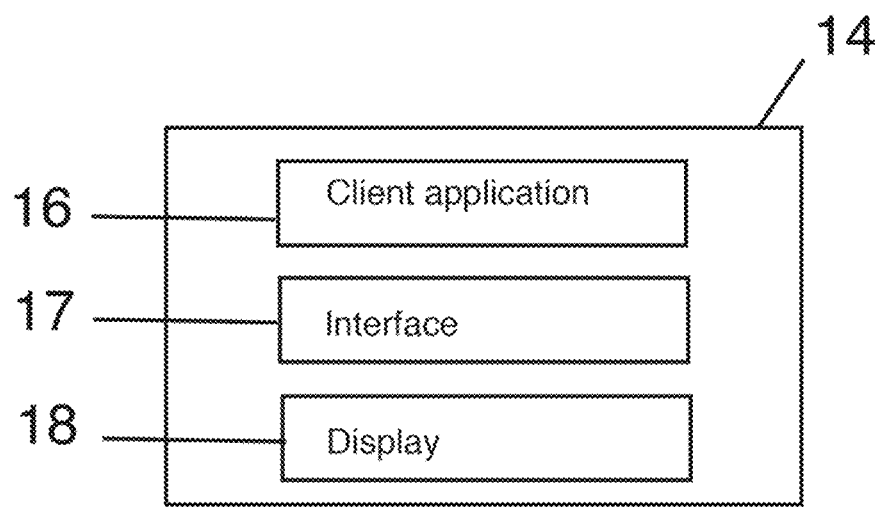
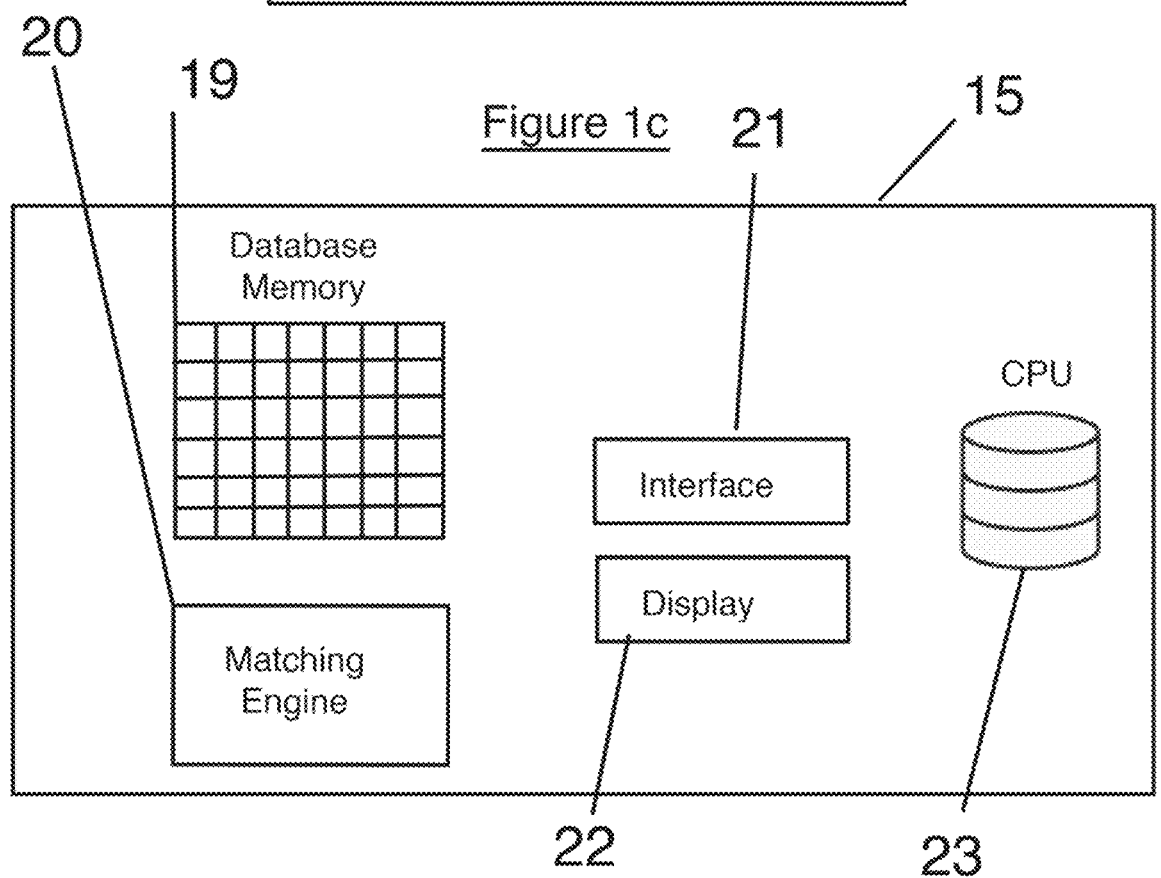

Figure 8

| Name | Property | Preference | Media 1 | Box 1 | Theme 1 |
|---|---|---|---|---|---|
| John Doe 1 | | | | | |
| John Doe 2 | | | | | |
| John Doe 3 | | | | | |
| John Doe 4 | | | | | |
| ... | | | | | |

MULTIMEDIA DIGITAL COLLAGE PROFILE USING THEMES FOR SEARCHING AND MATCHING OF A PERSON, PLACE OR IDEA

CROSS-REFERENCE TO RELATED APPLICATION(S)

The present application is a continuation of U.S. patent application Ser. No. 16/360,855, filed Mar. 21, 2019 which claims the benefit of U.S. Provisional Application No. 62/647,574, filed Mar. 23, 2018, the contents of which are hereby incorporated by reference in their entirety.

TECHNICAL FIELD

An embodiment relates generally to computer matching systems and more particularly to a matching process system and method that can be used in many areas including online dating/friendship, job searching and real estate and other areas.

SUMMARY

An embodiment of this invention seeks to provide a new and unique introduction and matching system and method for online dating, job searching, real estate searches, project collaboration, friendship and other matching systems.

The system and method call for the building of the multimedia collage by pairing multimedia (such as photographs, audio recordings, video recordings, text, music, graphic interchange formats (GIFs), emojis or other multimedia not yet invented) with specific themes. For example, for people such themes could be attributes of a person such as personality, perfect day, passions, work, values, mind, wellness; for a place, such themes could be attributes of a place such as neighborhood, weather, building materials, history, landscape, main room, sounds of the neighborhood. The multimedia can also be captioned. As an example, when creating the multimedia profile collage, an audio recording discussing a person's values could be paired with the "values" theme, and a video of a back yard could be paired with "back yard" theme.

Users can both create profile collages and search for matches.

In some embodiments, the system and method calls for search of a person, company, place or idea by theme. To begin the search, a user can select what theme or attribute is most important to the user. After being filtered by the user's factual preferences (such as gender, distance, age, etc.), the searching-user then receives a collection of users (i.e., potential matches) that have shared multimedia for that specific theme.

In this way, this system and method enables users to compare and contrast different multimedia associated with a single attribute or theme presented by different people, companies, places or ideas. Thus, the searching-user can search based on those attributes, qualities, experience etc. which are most important to the searching-user.

For example, a user could search for people by their "passions" or places by "back yard." Once the user finds multimedia of "passions" or "back yard" that the searching-user responds to, the searching-user can then can view and explore the person's, company's, place's or idea's full collage, which includes multimedia associated with a collection of themes.

The collage organization, in which any number of geometric shapes are organized, allows searching-users to get a visual snapshot of a person, place, company or idea which the searching-user can then explore by clicking on the geometric shapes or swiping or scrolling through the objects of the collage. The collage profile can include any media, such as video recordings, audio recordings, emojis, GIFs and songs or any other media that has not yet been invented.

Based on the multimedia of one theme or the totality of the multimedia profile collage, the searching-user can then make a choice based on how they feel about the collage and the person, company, place or idea described in the collage: the searching user can send a message to the creator of the collage, who can then respond to the request to connect; the searching user can bookmark or waitlist the person, company, place or idea described in the collage, putting the collage creator in a list of people that the searching user might want to communicate with later; or, the searching user can delete the collage so the user doesn't see the collage again.

In another embodiment, the system and method includes a matching system server coupled to a public network and accessible to multiple users. The matching system server includes a database that stores profile preferences, data and multimedia associated with users, and themes and specific shapes that forms users' multimedia profile collages. Users access the system and method through applications, (downloaded to terminals such as mobile devices, computers and other digital devices) which communicate with the matching system server through the public network.

In this embodiment, the users' mobile application, website application or other digital application includes a user-side collage builder user interface. The collage builder consists of a grid of geometric shapes that comprises the collage. The user selects a shape, then selects a theme to occupy that shape, and then selects multimedia to be associated with that theme in that shape. The user-side collage builder application provides "inspirations", that is prompts and ideas, to help users decide what multimedia to create and select for a particular theme, and what should be expressed with that multimedia. The user also has the option to caption the multimedia. The multimedia is uploaded by the user and hosted on the system server in association with that user, that particular theme and that particular geometric shape within the collage design, forming data within the system server's database.

In another embodiment, a user who wishes to search for a person, job, place, idea selects on the user application the theme that the user would like to use to search. Based on preferences already provided by the searching-user and stored in the system server database, the system server database displays to the searching-user a list of users (that both match the searching-user's preferences and have created multimedia for the particular theme) along with their associated multimedia for that searched-theme. The searching-user can then view, explore, compare and contrast the multimedia created for that theme by multiple users. The searching-user can then choose to view a particular user's full collage, which is hosted on the system server and displayed on the application sitting on the searching user's terminal. In another embodiment, a wild card search would mix up themes and display people randomly but still based on the user's preferences.

In another embodiment, events or gatherings are used as a means of finding other people (or companies, places or ideas) and also a means of facilitating two users connecting at events that both of them plan to attend.

In this embodiment, the users' mobile application, website application or other digital application includes a list of events including parties, workshops, talks, tastings, dances, art, fundraisers, outdoor activities, festivals, food/drink, live music, job fairs, open houses for real estate, etc., either curated or user-added. In settings for the list of events, users determine which events they want to see by inputting their zip code, radius from zip code in miles or kilometers and the type of events they are interested in. In another embodiment, distance from the user could be determined using geo-tracking, or area covered selected on a map, rather than an inputted zip code. If a user plans to attend a particular event, the user can mark the user as "attending". The user can also get more information about a particular event and can discover other users who have also marked themselves as planning to attend. The user can see those who plan to attend the particular event segmented into 1) people (or companies, places or ideas) the user is in conversation with or about; 2) people (or companies, places or ideas) the user has bookmarked or waitlisted; 3) people (or companies, places or ideas) that match the user's preferences; and 4) all other people, companies, places or ideas.

In another embodiment, a user's profile collage includes a listing of events that that the user is planning to attend so that another user can arrange to meet the first user at an event they are both already planning to attend.

In another embodiment; the content that users create in their collages (with media such as photographs, audio recordings, video recordings, text, music, graphic interchange formats (GIFs), emojis or other multimedia not yet invented) is given a "Thumbs Up" or "Like" by other users if the other users like the content. Other feedback may also be used. The content with the most "Thumbs Up" or "Likes" appears in a "thread" or feed of content. Users can then view the content in the thread or feed of popular content. The thread or feed can be sorted by number of "Likes" or by "Theme" of content. If a user is interested in a particular piece of content in the thread or feed, the user then can click through to the collage of the creator of that content and send a message to connect with the creator.

BRIEF DESCRIPTION OF THE DRAWINGS

FIG. 1A is one embodiment of the matching system.

FIG. 1B shows the contents of the user terminals in FIG. 1A.

FIG. 1C shows the contents of the system server in FIG. 1A.

FIG. 8 shows the database on the system server.

FIG. 9C shows the user interface used by a job seeker searching for a company to work for.

FIG. 14 shows how someone would give a "Thumbs up" or "Like" for content that they are interested in.

DETAILED DESCRIPTION

Figure 2A:
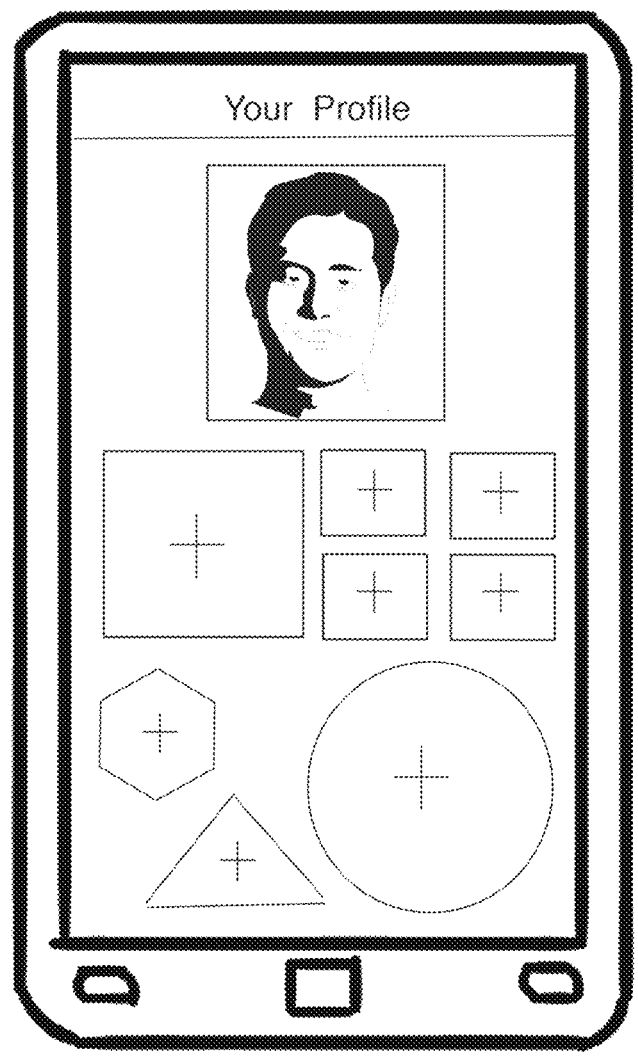
FIG. 2A shows the user interface on a mobile device terminal after the user has registered and is being guided to create a multimedia profile.

Profiles of users on existing dating websites and mobile dating applications fall into two categories.

The first legacy category is a profile of an individual that contains a series of photographs of the individual associated with paragraphs of text written by the individual answering questions, such as "self-summary", "favorite books or movies", "what I'm doing with my life", and "what I spend time thinking about". One issue with this type of profile is that profile creators often write lengthy text in their profiles which may discourage other users from processing the information and initiating interactions with the profile creator. In addition, profiles containing only photographs and text tend to convey limited information about a person (as compared to information conveyed by video recordings, audio recordings and other media) and can seem like a dating resume with facts, without giving an authentic feel for the person. Dating website/mobile applications that fall into this category include, for example, Match.com, Okcupid and Jdate.

The second type of profile, initiated by Tinder in 2012 and also used by Bumble, Hinge and other mobile dating applications, typically consists of limited, superficial information about the profile creator, such as a few photographs and very brief written text, usually limited to less than 400 characters. Given the paucity of information, these profiles do not provide a full and accurate picture of the profile creator; searching users have difficulty determining if the profile creator is a viable match. In addition, with this type of profile people complain that they are being treated as a commodity and feel that they are judging others and being judged by others based on superficial attributes—rather than exploring and discovering the nature of a person.

In one application, dating, many different methods for matching may be used. Those include:

Matching by preferences. Most dating apps/sites start with this basic type of matching, insuring that preferences for factual identifiers such as gender, age, height, religion, distance are delivered.

Psychology matching. Some dating sites/apps such as eharmony employ detailed psychological matching. The sites have users answer lengthy sets of questions which are used to determine a person's psychology. This psychology is then used to match with others whom the site determines are most compatible with the first user's psychology.

Artificial Intelligence. Some sites/apps such as Tinder are increasingly using artificial intelligence to improve matching. The site keeps track of who you have "liked" and then seeks to deliver potential matches that have similar traits to the people you have already "liked."

Multiple choice questions about tastes, desires and beliefs. Some sites/apps like Okcupid let users answer thousands of multiple choice questions about tastes, style, desires, etc. and they match people based on the percentage answers they have in common.

Answering broad questions. Some sites/apps, such a Match.com and Okcupid, ask open-ended questions such as "My interests," "In my own words," "Self-summary", "What I'm doing with my life," "I'm really good at," and "The first thing that people notice about me." This enables people to write often long-winded, self-summaries with information and facts about themselves.

The object of some embodiments described herein is to address drawbacks of the above systems. Some embodiments enable the creation of more detailed and multifaceted presentations of a person, company, place or idea than can be created with a few photographs and a few sentences of text. By enabling the creation of multimedia profile collages with multimedia objects associated with attribute themes, an in-depth exploration and discovery of a person, company, place or idea is provided. Through the process of sharing that occurs with a multimedia collage, greater curiosity and connection is achieved. And, while the systems and methods described here are described for the dating application, one skilled in the art would understand that the systems and methods can be applied to other applications where matching is desired.

In some embodiments, the multimedia collage can use various type of media, such as photographs, video recordings, audio recordings, text, emojis, songs and GIFs or any other media format that has not yet been invented. This media enables users to present extensive, multifaceted descriptions to other users seeking matches, and to obtain the same from those users, thereby encouraging user exploration and engagement in the process of seeking matches. For example, audio recordings in the multimedia collage enables users to hear another user's voice, and video recordings enable users to see another user's movements and facial expressions. Emojis, GIFs and songs enable a user to obtain a much fuller picture of the other person's tastes and personality.

Moreover, by enabling people to search by the theme attributes, an embodiment enables prioritization and searching of people, jobs, places, or ideas based on the attributes that are most important to the searching users.

Some embodiments ensure that matches align with basic preferences such as gender, age, distance and a number of other preferences. First, a pool of users is created based on those users who have created a response to the specific theme that a user is using to search with, for example, themes for dating such as personality, childhood or wellness. Then this pool is narrowed by keeping only those users whose factual details and preferences (such as age, gender, location, etc.) match the searching-user's preferences. The final matching is based on each user's response to other users' multimedia content in the collages.

Another embodiment stems from the notion that sharing creates connection and bonding. The embodiment provides a way for users to share about meaningful parts of their lives using themes to guide them. This embodiment then enables other users to watch, see, read or listen to other users' shared content to determine if there could be connection and commonality. Moreover, users can share content using video recordings and audio recordings, in addition to photographs and text, so that other users can get a deeper, more authentic sense of other users as people by seeing them in action and listening to their voices.

Another embodiment stems from the fact that using themes or attributes to create profile collages helps tell deeper, fuller and more nuanced stories about people, jobs, places and ideas. For example, a hiking photo shared for the theme of community tells a very different story than the same photo shared for the themes of perfect day, sports or ideal partner.

To create their multimedia collage, users can be asked to select a theme or attribute for each of the boxes in the multimedia collage. They are then asked what type of media they would like to put in that box for that theme. The choices can include a photograph, video recording, audio recording, text, emoji, GIF, music or other media. For each theme, users are provided a list of ideas, prompts, inspirations to help spark their shared content for that theme.

When asked to share about oneself, people can be intimidated by a blank page or blank multimedia collage. In one embodiment, there is a method to guide users to share what is personal, heartfelt, intimate and true to them. These guides are not, by contrast, asking users for facts about their lives. Rather, the prompts are asking users to share about, for example, what makes them happy, what they are most grateful for, what values are most important to them, and how they like to learn. These prompts help users express and share their essence, rather than just facts about themselves.

Searching functionality enables each user to focus on those attributes or themes that the searching-user values most. So, if a user cares most about a potential match's passion or personality or mind or attitude toward work or wellness, then that user can search using one of those themes and thereby focus on how others share about that theme when ascertaining which potential users would make the best match with the searching-user.

In most matching and searching systems, whether searching for a date, a job, real estate, friend or project collaborator, searchers must start at the top level, and then dive into the details, without regard to what is important to the searcher. Thus, if a user wants a home with a certain style of back yard, the user must go through many real estate listings, searching through all the photographs before seeing the back-yard image in each one. With some embodiments disclosed herein, the user can do a search for "back yard" and can view and compare back yards from a number of properties all at once. In the dating use-case, the user can search "values" and compare the values of various users. In the company-job searching use-case, a job searching can compare "benefits" or "corporate vision" of a number of different companies.

This invention facilitates people expressing a more complete and authentic presentation of themselves, real estate, jobs, project and ideas so that searching-users can get a more accurate sense of who a person is, what a place is like, what a company is like, what a project is like, etc.

In another embodiment, another way for a searching user to connect with other users is through events or gatherings. This embodiment contains a list of nearby events that are shown based on the searching user's preference for type of events and distance from the searching user. If the searching user sees an event that the user is planning to attend, the searching user can mark himself/herself as "attending" and can see who else is attending. The searching user can then reach out to other users who are planning to attend the same event and then arrange to meet them at that event, whether for dating, friendship, collaboration or employment. As an example, in other dating apps and websites, people often chat for a long time but do not end up meeting. This embodiment addresses this drawback by facilitating a meeting at an event that both parties are planning to attend.

In another embodiment, when this invention is used for job searching, events that include speakers and people from different companies can be listed so people can connect in person with employees and representatives from the companies that they are interested in.

In an embodiment where this invention is used for real estate, the event or gathering section would include open houses based on zip code and settings.

When users create their profiles by responding to themes, they uniquely express themselves (or a company, place or idea), creating interesting, thoughtful and impactful content. In another embodiment, searching users can express their appreciation for the content by giving it a "thumbs up". The most popular content then appears on a thread or feed creating an additional means of finding people (companies, places or ideas). Searching users can browse through this most popular content thread or feed. Searching users can reach out to the users who created the content that most resonates with them.

FIG. 1A is one embodiment of a computer based matching system. The system can include a matching server 11 that may be distributed on one or more physical servers with each including database, processor, memory, operating system, input/output interface and a network interface.

The system can be coupled to a public network 10, such as the Internet and/or a cellular-based wireless network or any other public network. Public network 10 could be any communicative platform set up to exchange data or information from users, whether wireless or wired, including old school telephones, local area network (LAN), metropolitan area network (MAN), wide area network (WAN), wireless local area network (WLAN), virtual private network (VPN), intranet, or any other appropriate architecture or system that facilitates communications in a network or telephonic environment, including a combination of any networks or systems described above.

Users interact with the matching server through terminals such as in one embodiment shown in FIG. 1A, computers 12 or mobile device 13 or any terminals including cellular telephone, an electronic notebook, a laptop, a personal digital assistant (PDA), or any other suitable device (wireless or otherwise, some of which can perform web browsing), component, or element capable of accessing one or more elements within the matching system. As in FIG. 1B the user interface 17 might as in this embodiment be a computer or mobile phone but could also be any other human user interface including video camera, microphone, keyboard etc. Displays (as in 12 and 13) may be a computer monitor or a mobile screen but also could be a projector, speaker or other displays.

The terminals and the system server communicate via the public network 10.

This matching system can be used to match people for dating, to match people with jobs and companies, to match people with real estate and to match other entities of another kind. Data stored in the system server 11 in one embodiment may include data about users, including their preferences and media that they have uploaded to be stored on the server. Such data could include numeric, voice, video, text, GIFs, emoji or script data, or any other suitable information in any appropriate format that may be communicated from one point to another.

FIG. 1B shows the contents of terminals 12 and 13. In some embodiments, the terminals can be composed of a client application 16, an interface 17 and a display 18. In other embodiments, a client application might not reside on the terminal.

FIG. 1C shows one embodiment of the system matching server 11 which is composed of memory which contains databases 19, the matching engine 20 composed of code and algorithms that run the matching process, an interface 21, display 22 and CPUs 23. In some embodiments, the system matching server 11 may be composed of a series of servers or other equipment each performing different or the same functions in order to receive and communicate information to terminals such as 12 and 13.

In one embodiment matching server 11 contains a matching engine 20 which includes software and/or algorithms to manage the operations for processing, communicating, delivering, gathering, uploading, maintaining, and/or generally managing data. In another embodiment, such operations may be done by hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

In one embodiment, each user establishes a "match profile" that includes data and media potentially relevant to establishing a successful interpersonal relationship with another user, or in another embodiment matching with a company or with real estate or another object.

In one embodiment, a user on a terminal, such as 12 or 13, using the interface 17 and the display 18, downloads the client application 16 onto their terminal. Using the client application 16, the user registers with the matching server 11, by, for example, submitting information and data about herself or himself to be stored on server 11. Such information for the dating use case may include name, age, location, education, height, work, religion and other questions; matching preferences (questions about what the user is looking for in a match); and, a profile photograph. The client application can ask the user a series of questions to obtain such data. In another embodiment, some of the data is pulled in from other applications, for example from applications such as Facebook, Instagram, Google.

Figure 2B:
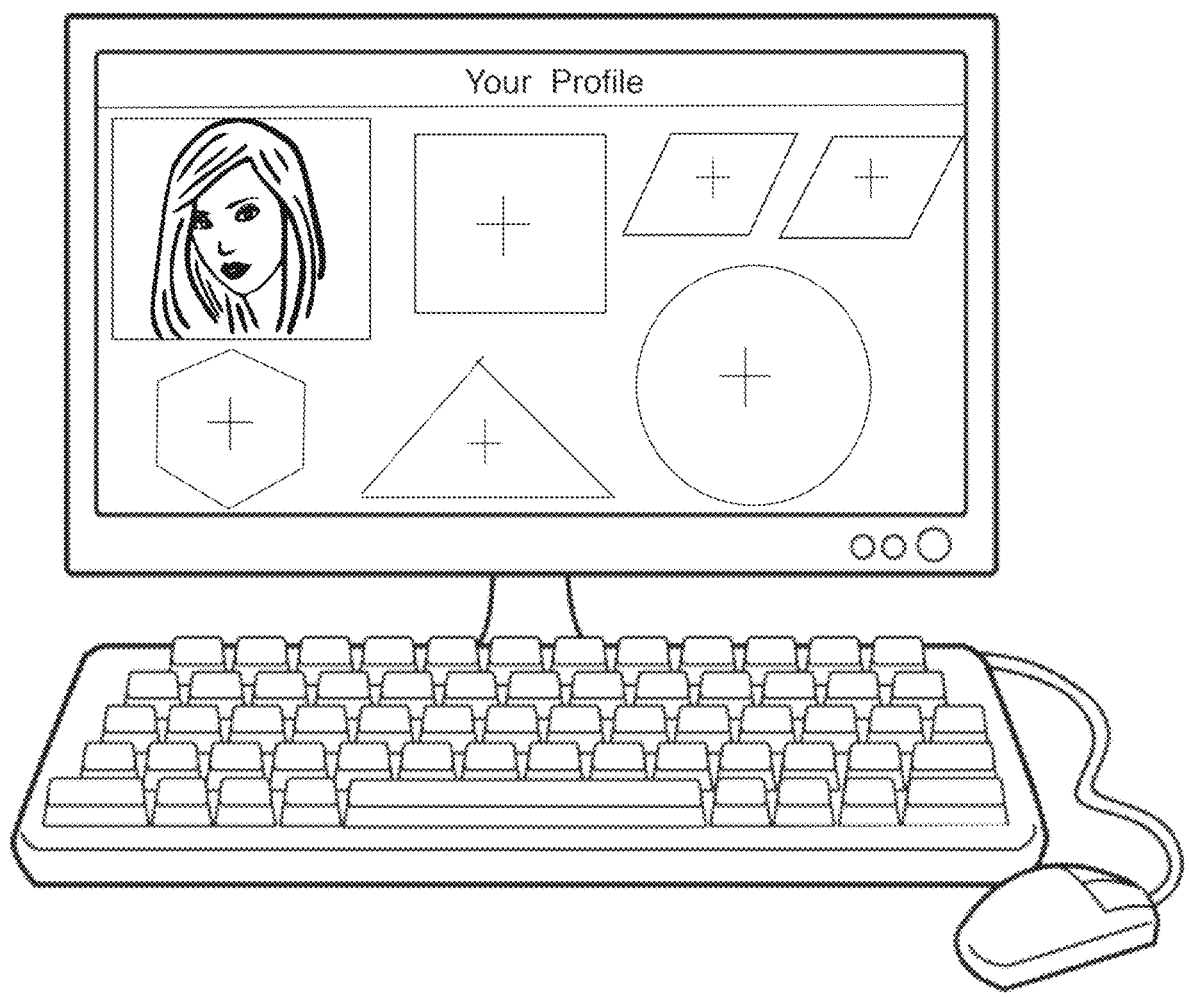
FIG. 2B shows the user interface on a computer terminal after the user has registered and is being guided to create a multimedia profile.

In another aspect, once registration is complete, the user is guided to create his or her multimedia media profile collage using client application 16, user interface 17 and display 18 as shown in FIG. 2A (an example of an embodiment on a mobile device) and FIG. 2B (an example of an embodiment on a computer device).

As seen in FIG. 2A and FIG. 2B, the user has already registered, answered registration questions and uploaded a profile photograph. The user interface in these figures includes a series of geometric objects creating an empty profile collage wherein, in this case, plus signs prompt the user to add media to create her or his multimedia collage profile. The shapes in the multimedia collage can be any shape including rectangles, squares, circles, triangles, octagons, pentagons etc. In this embodiment, the geometric shapes are separated. In another embodiment, they could be overlapping and layered.

Figure 3:
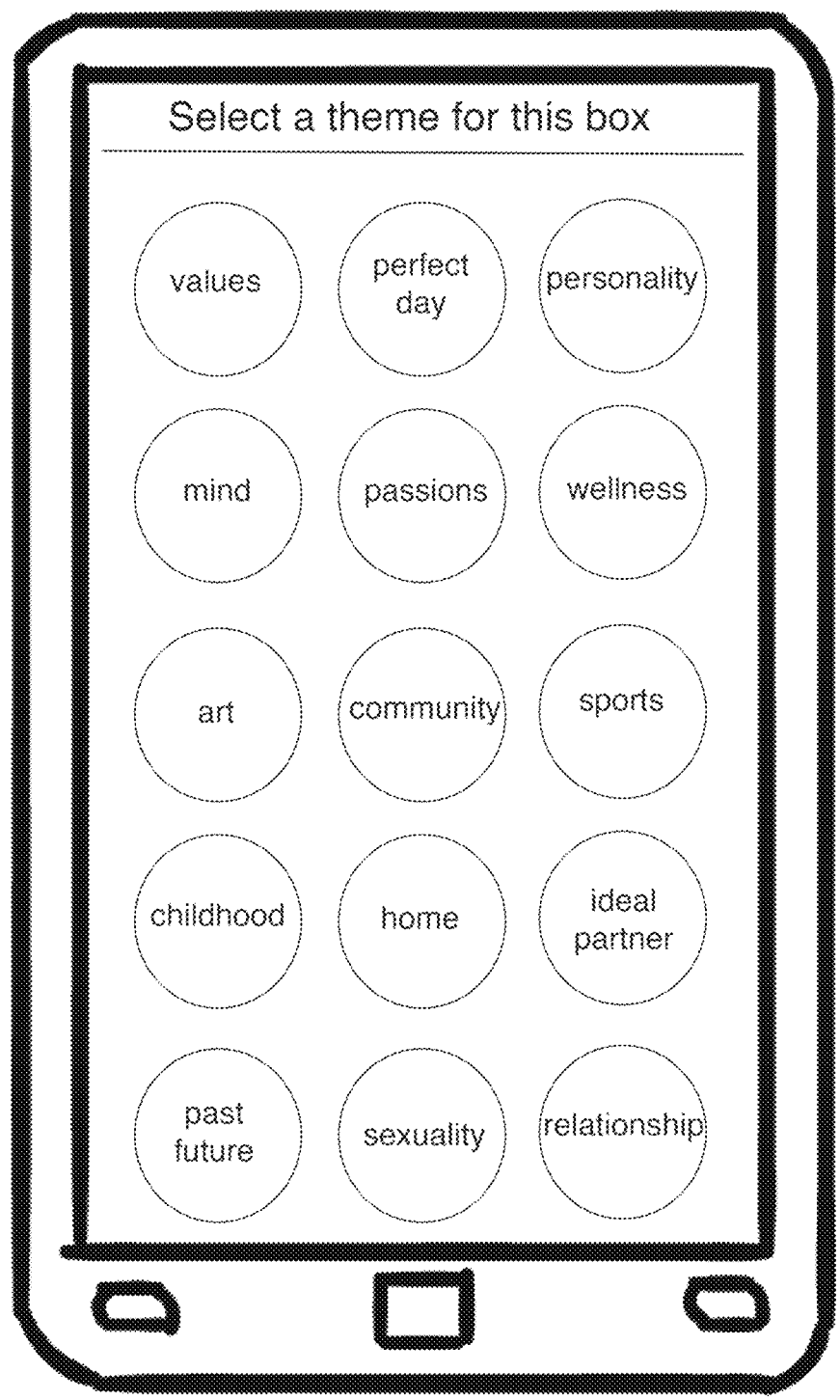
FIG. 3 shows an example of the user interface, in the instance of a dating/friendship matching system, where as part of the multimedia creation process, a user on a mobile device is asked to select a theme for a particular box in the multimedia profile collage.

As seen in FIG. 3, users are asked to select from themes to occupy each of the geometric shapes in their profile collages. In some embodiments, the users can not repeat themes in the collage, that is, a theme can only be used once in the collage. In another embodiment, a single theme can be used one or more times.

FIG. 3 shows the type of themes that might be used for a dating matching application. These could include themes or attributes such as personality, mind, ideal partner, values, passions, art, community, sports, childhood and relationship style.

Figure 4:
FIG. 4 shows an example of the user interface, in the instance of a real estate matching system, where as part of the multimedia creation process, a user on a mobile device is asked to select a theme for a particular box in the multimedia profile collage.

FIG. 4 shows the type of themes that might be used to match a person with real estate. These could include themes or attributes such as architectural style, landscape neighborhood, entry, back yard, living room, kitchen, school system, safety and bathrooms.

Figure 5:
FIG. 5 shows an example of the user interface, in the instance of a job-company matching system, where as part of the multimedia creation process, a user on a mobile device is asked to select a theme for a particular box in the multimedia profile collage.

FIG. 5 shows the type of themes that might be used to match a person with a company for potential employment. These themes or attributes could include corporate values, office space, corporate culture, CEO, customers, neighborhood and corporate vision.

In another embodiment, users are free to upload any multimedia into the geographic shapes of the multimedia profile collage, without regard to themes. In another embodiment, instead of themes, users are provided ideas, key words, feelings, colors or any other prompts that could be imagined to fill the geometric shapes of the multimedia collage.

Figure 6A:
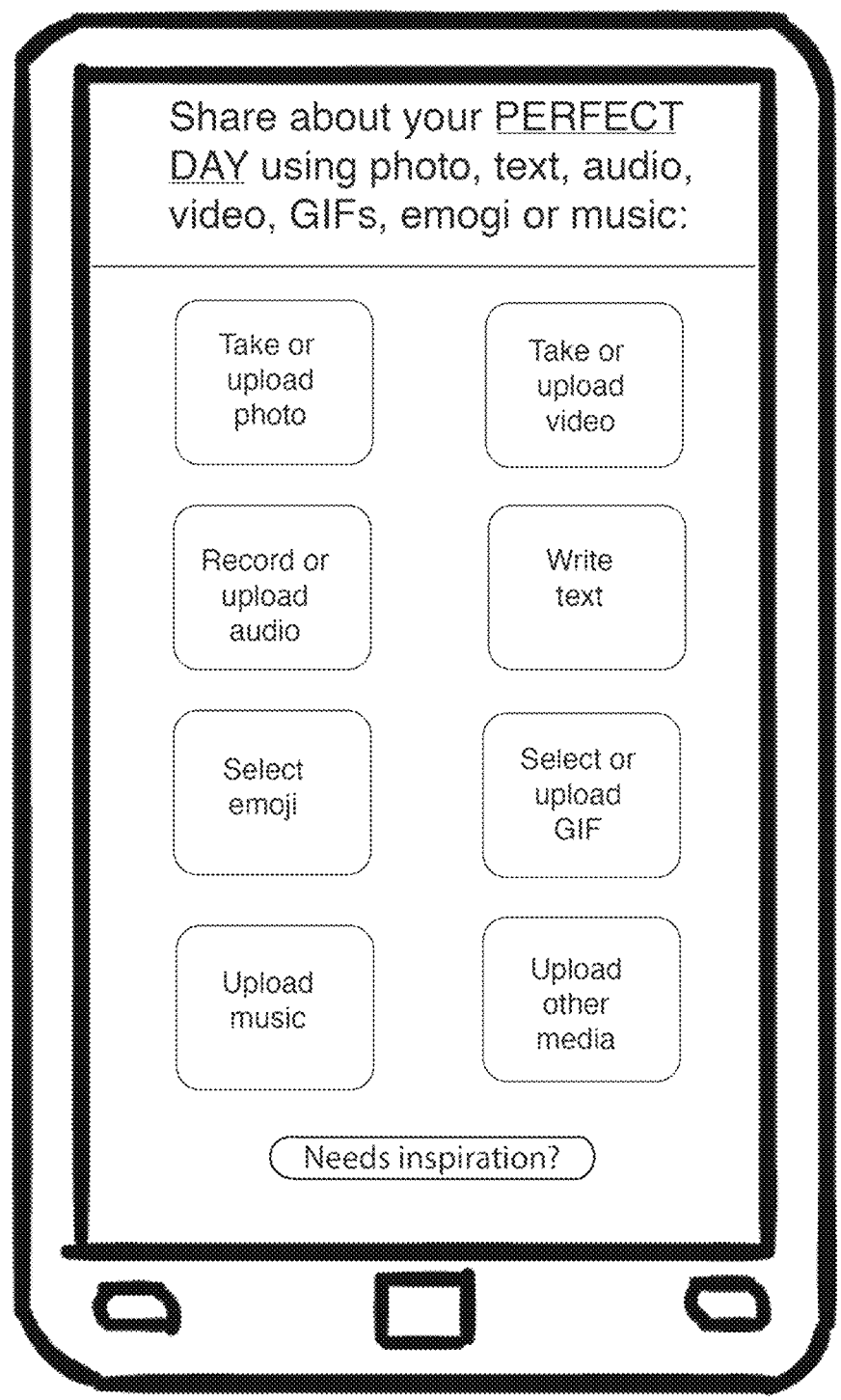
FIG. 6A shows the interface for uploading media to create the multimedia collage. In this example, the user is being prompted to selected media for "perfect day" theme.
Figure 6B:
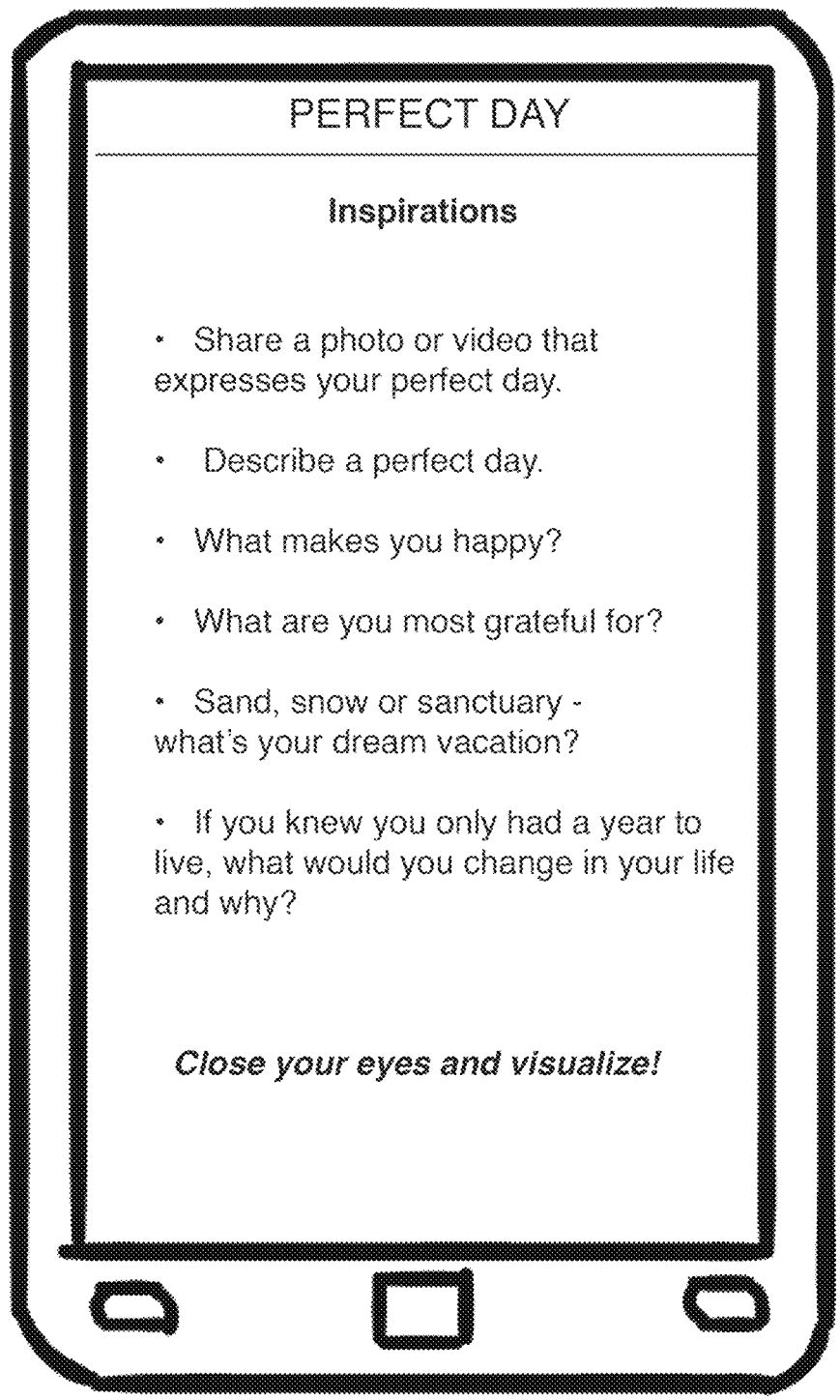
FIG. 6B shows prompts or "inspirations" to help the user select and create media for the "perfect day" theme.

FIG. 6A shows that once the user selects the theme for a specific geometric box, the user is guided by the client application 16, using the user interface 17 on the display 18 to upload media to express and be associated with that particular theme. In this example, in FIG. 6A, the user is invited to upload media to express the theme of "perfect day." In this embodiment, media choices include photographs, video recordings, text, audio recordings, GIF, emoji, music and any other media that exists or does not yet exist. In another aspect, the user can be then prompted to add text or a caption to associate with the multimedia that has been uploaded. As shown in FIG. 6B, the user application offers prompts ("Need Inspiration?") to provide suggestions and ideas to help the user select media to upload on a particular theme.

Figure 7A:
FIGS. 7A and 7B show completed multimedia profiles on mobile device and computer terminals.
Figure 7B:
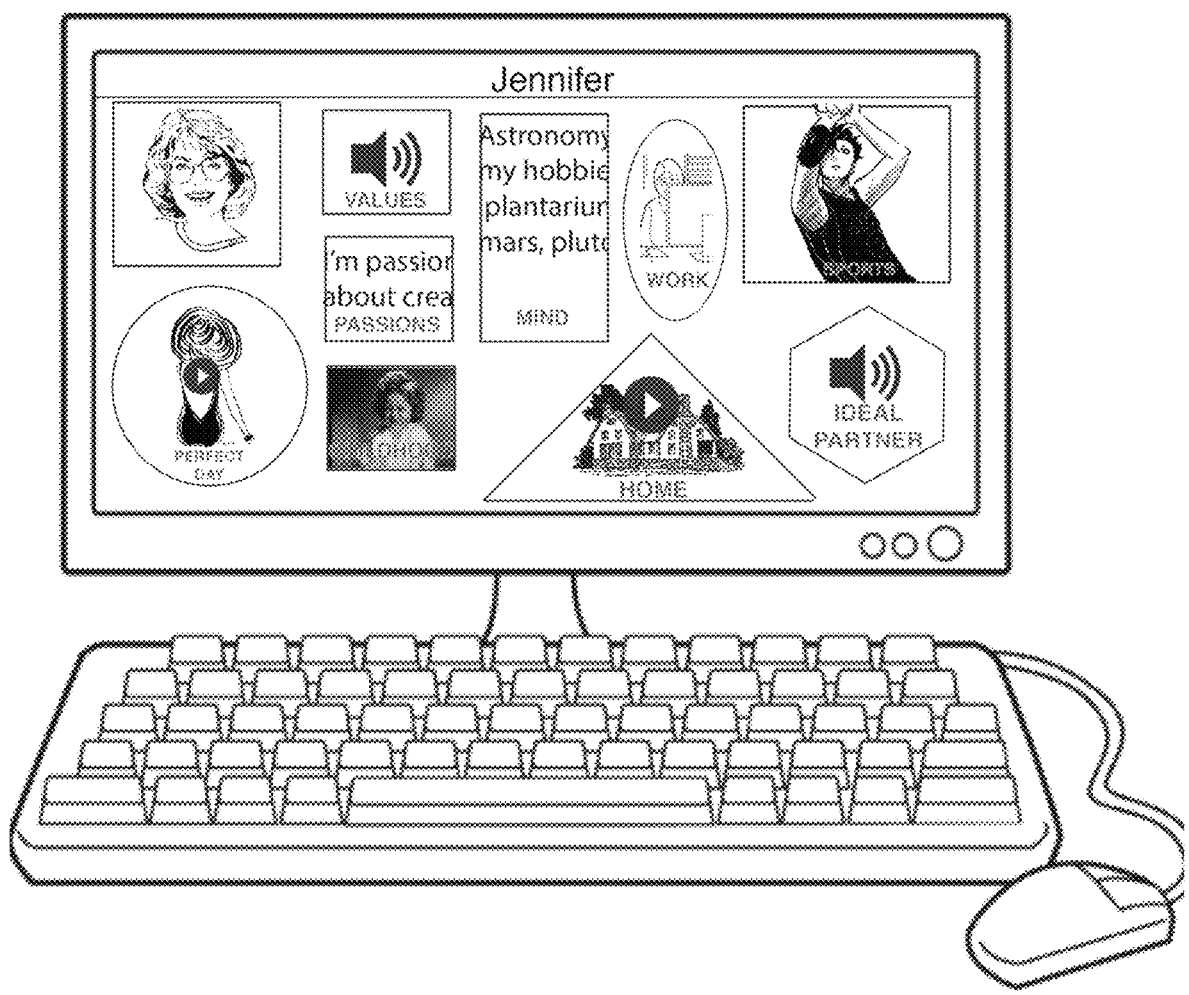

FIG. 7A shows an example of what a final profile collage would look like on a mobile device. FIG. 7B shows an example of what a final profile collage would look like on a computer terminal. In this example, the multimedia collage includes many different geometric shapes and different multimedia types associated with different themes. In another embodiment, the multimedia profile collage might include a different number of geometric shapes and multimedia types. In another embodiment, the geometric shapes might be layered. In this example, the themes are listed over the geometric shapes. In another embodiment, the themes might not be listed.

FIG. 8 depicts an embodiment in which the matching system server 11 has a database 19 which contains a pool of users 24. Each entry in the database has associated information, data, preferences, media along with related captions, themes and specific collage boxes the entry is associated with.

Figure 9A:
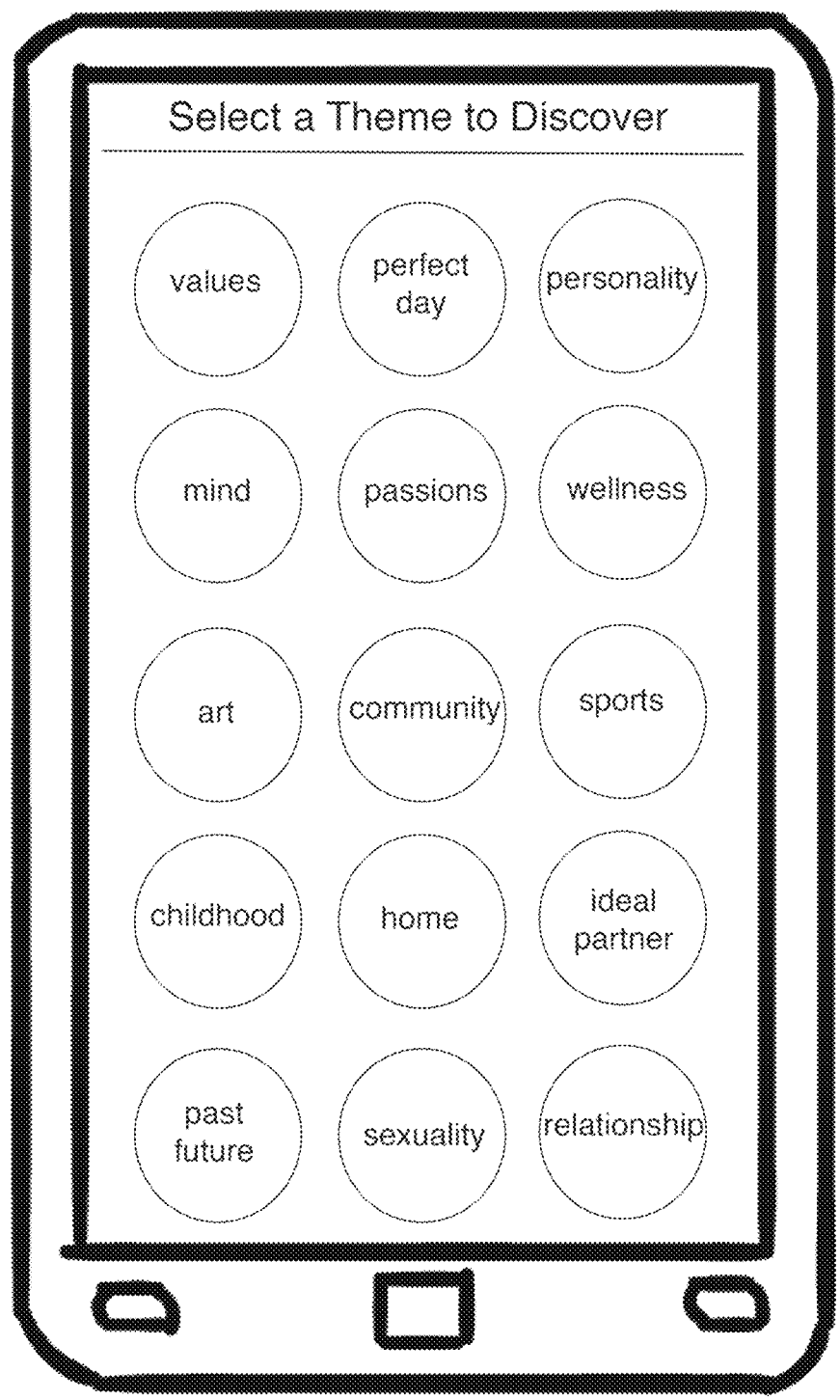
FIG. 9A shows the user interface used to search for potential matches for dating and/or friendship.
Figure 9B:
FIG. 9B shows the user interface used to search for potential matches for real estate.
Figure 9C:
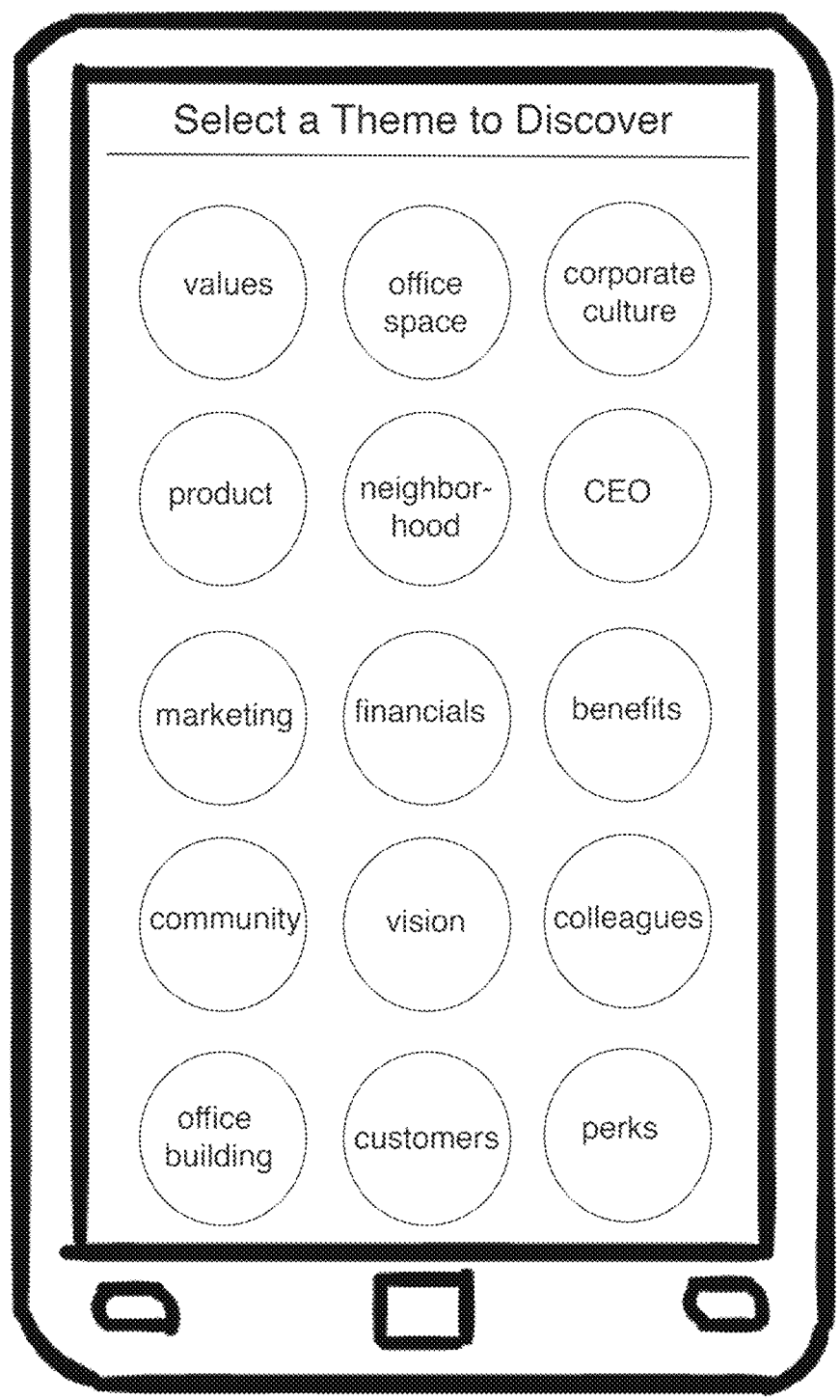

In another embodiment, the search functionality can be theme-based. Thus, when a user is searching for another compatible user, real estate or company, that user searches by theme. FIG. 9A shows an example of search by theme in the case of dating, FIG. 9B in the case of a real estate and FIG. 9C in the case of a company. In another embodiment, search could be conducted with other types of themes. In another embodiment, search is not theme-based and is conducted on another basis.

In one embodiment, when a user clicks to search by a particular theme, the matching engine 20 queries the database base 19 for a list of users who have created multimedia for that particular theme.

Figure 10:
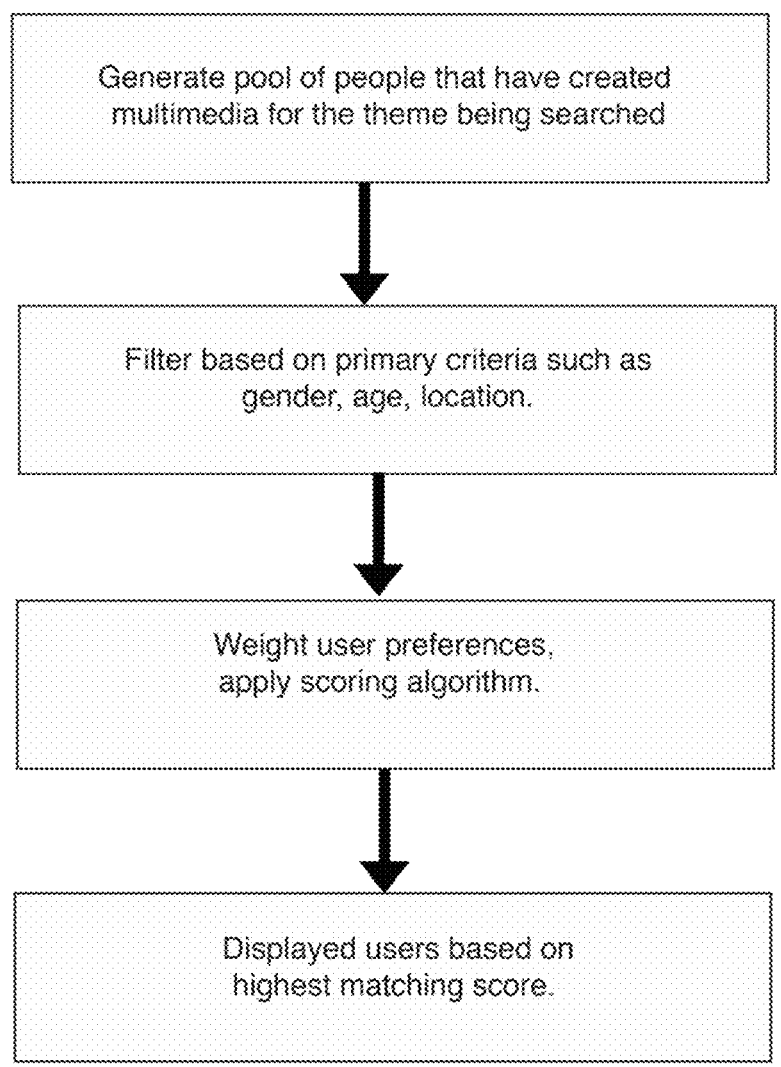
FIG. 10 shows one embodiment of the flowchart used by the matching system server.
Figure 11A:
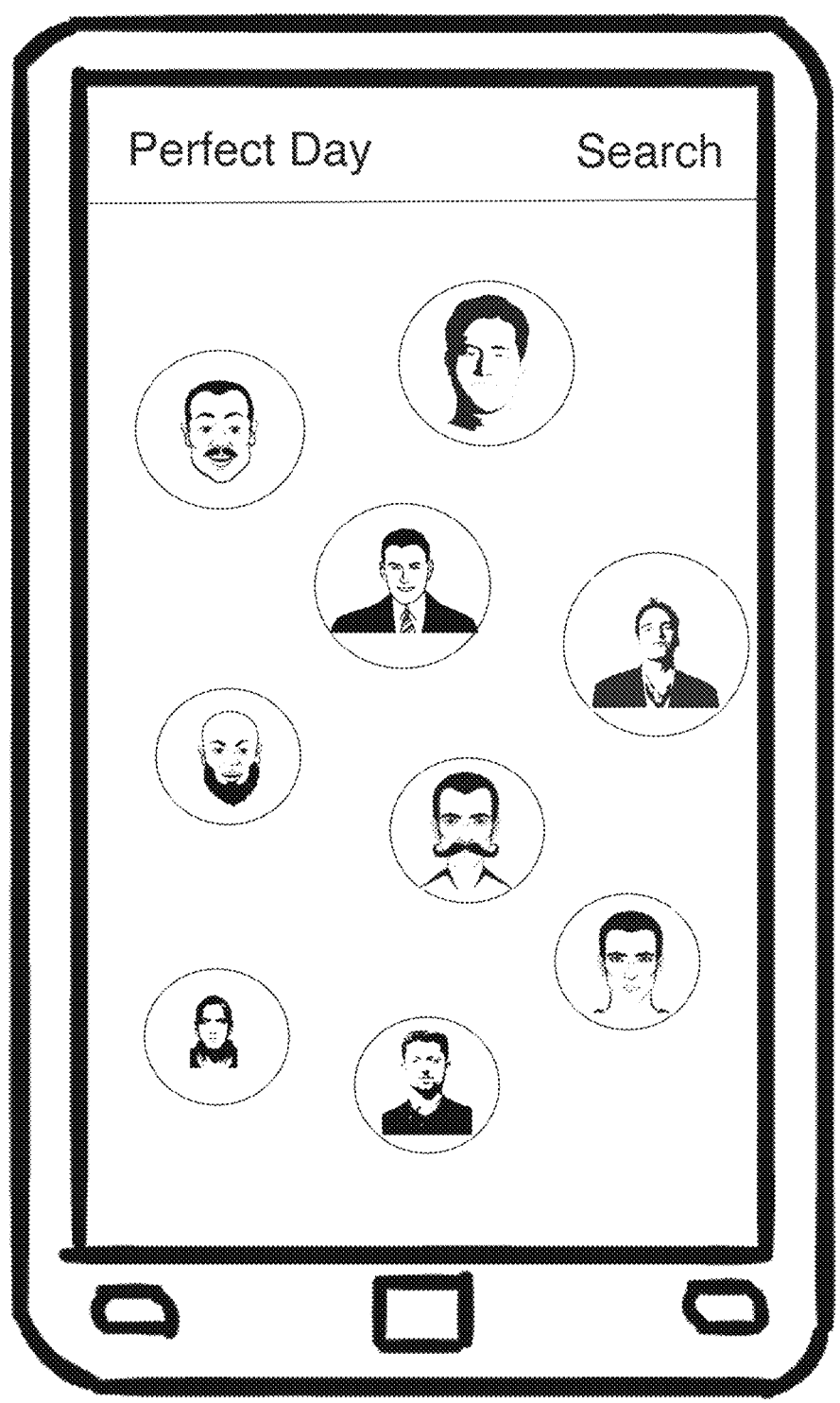
FIGS. 11A, 11B and 11C show different embodiments for search display of potential matches by theme for dating/friendship. 11D shows an embodiment of search display of potential matches for real estate.
Figure 11B:
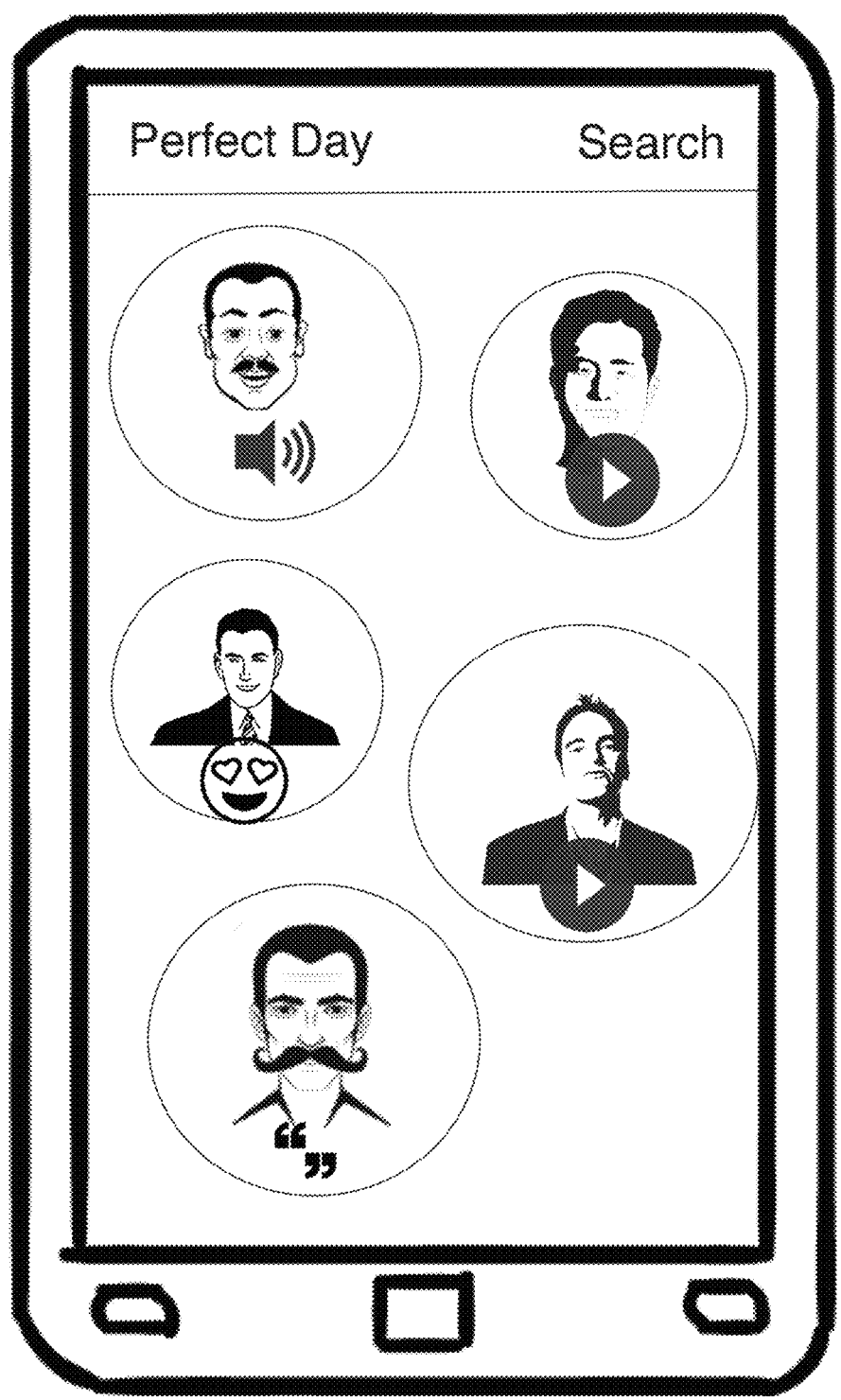
Figure 11C:
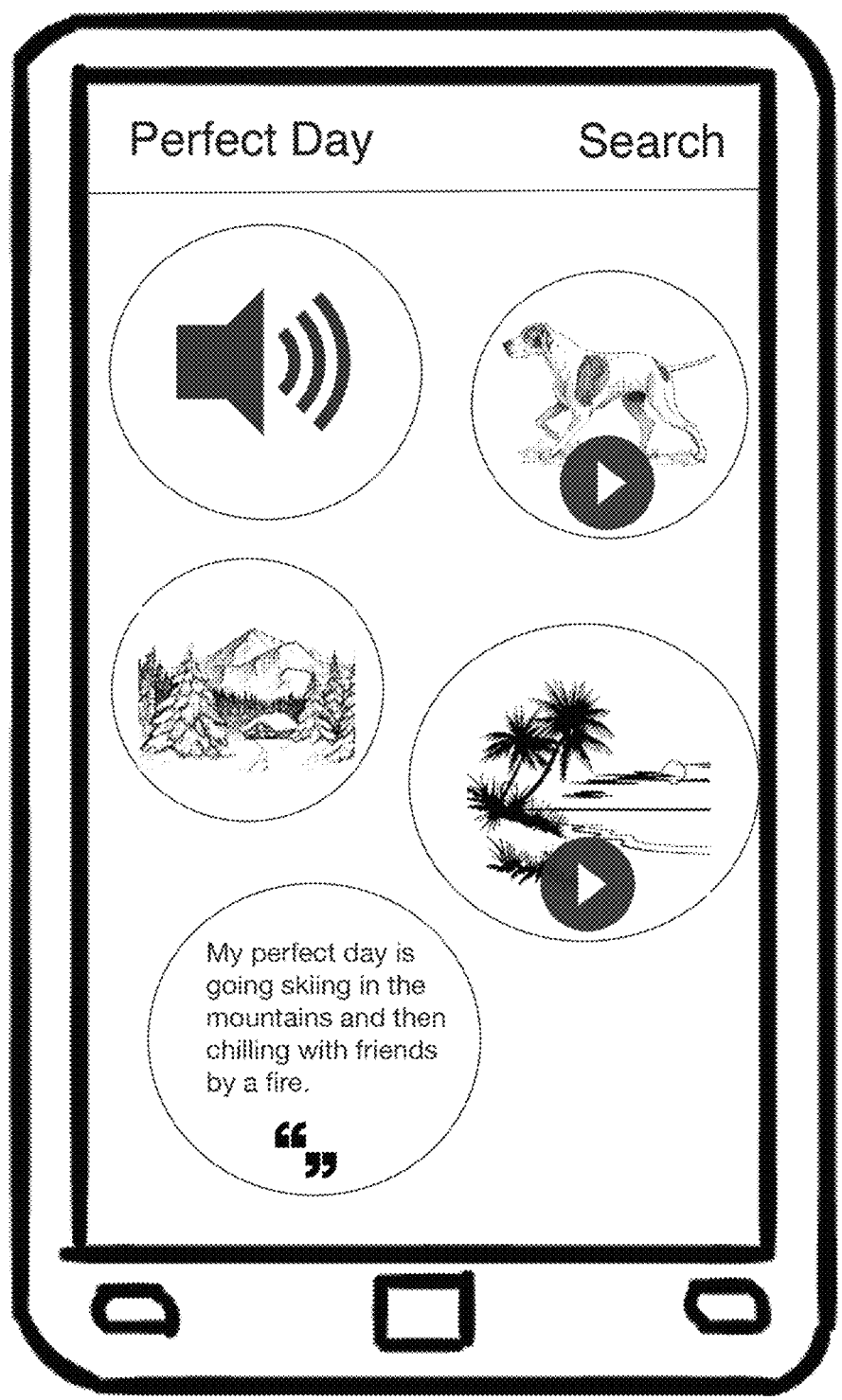
Figure 11D:
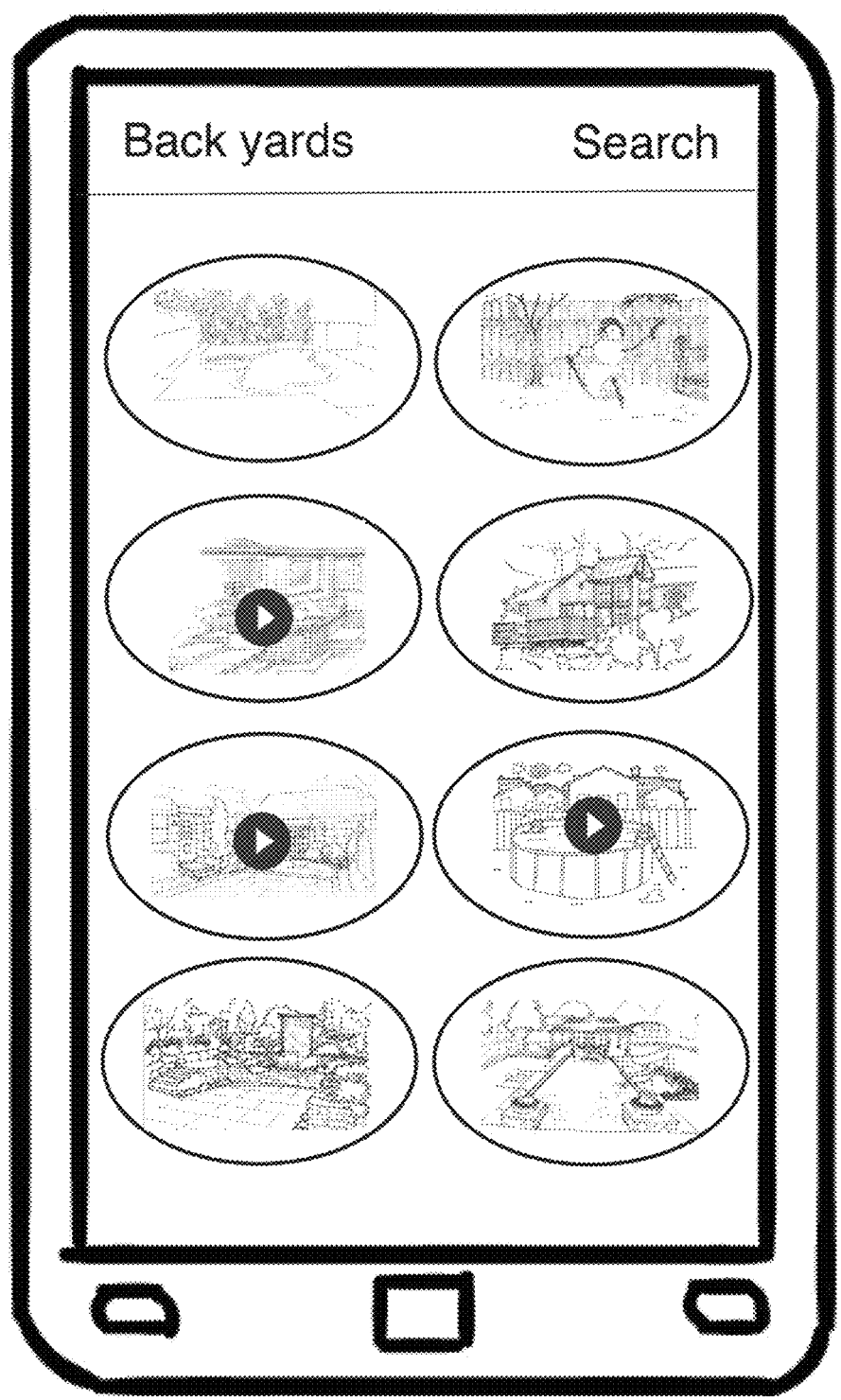

FIG. 10 shows a flowchart of an example of how users would be selected to appear as potential matches in the dating use case. The matching server generates a pool of people that have created multimedia for the theme selected by the searching-user. This pool is then filtered by the primary criteria of the searching-user. Primary criteria could include criteria such as gender, age, and location.

In another embodiment, users to be displayed to the searching-user, along with multimedia they have uploaded for the theme being searched, are selected randomly from among the users in the filtered pool.

In another embodiment, after the pool is filtered by the primary criteria, secondary preference criteria such as religion, alcohol, tobacco and drug use, finances and desired family are scored to give each potential match in the pool a matching score depending on how well they each match the searching-user's preferences. Those users with the highest matching score are then displayed to the searching-user, together with multimedia they have uploaded for the theme being searched.

In another embodiment, other applications including tests of personality, values and relationship styles are used to create a tertiary matching criteria that are also scored and included in a user's matching score.

In another embodiment, other criteria employing artificial intelligence, data science, analysis of the content of uploaded media could be used to create a fourth criteria to add to the matching score.

After a user selects a theme with which to search, the matching server system 11 queries the database 19 which serves up a series of users based on the matching processes outlined above.

FIGS. 11A, 11B, 11C and 11D show examples of how these searches can be displayed. In 11A-C examples, the matches who have filled out the "perfect day" multimedia box are displayed. In one embodiment, FIG. 11B, the users are displayed with the type of multimedia that they have uploaded for "perfect day." In another embodiment, FIG. 11C, the actual media for "perfect day" are displayed. In 11D, "back yards" are displayed with photographs and video recordings as per a real estate use case.

Figure 12A:
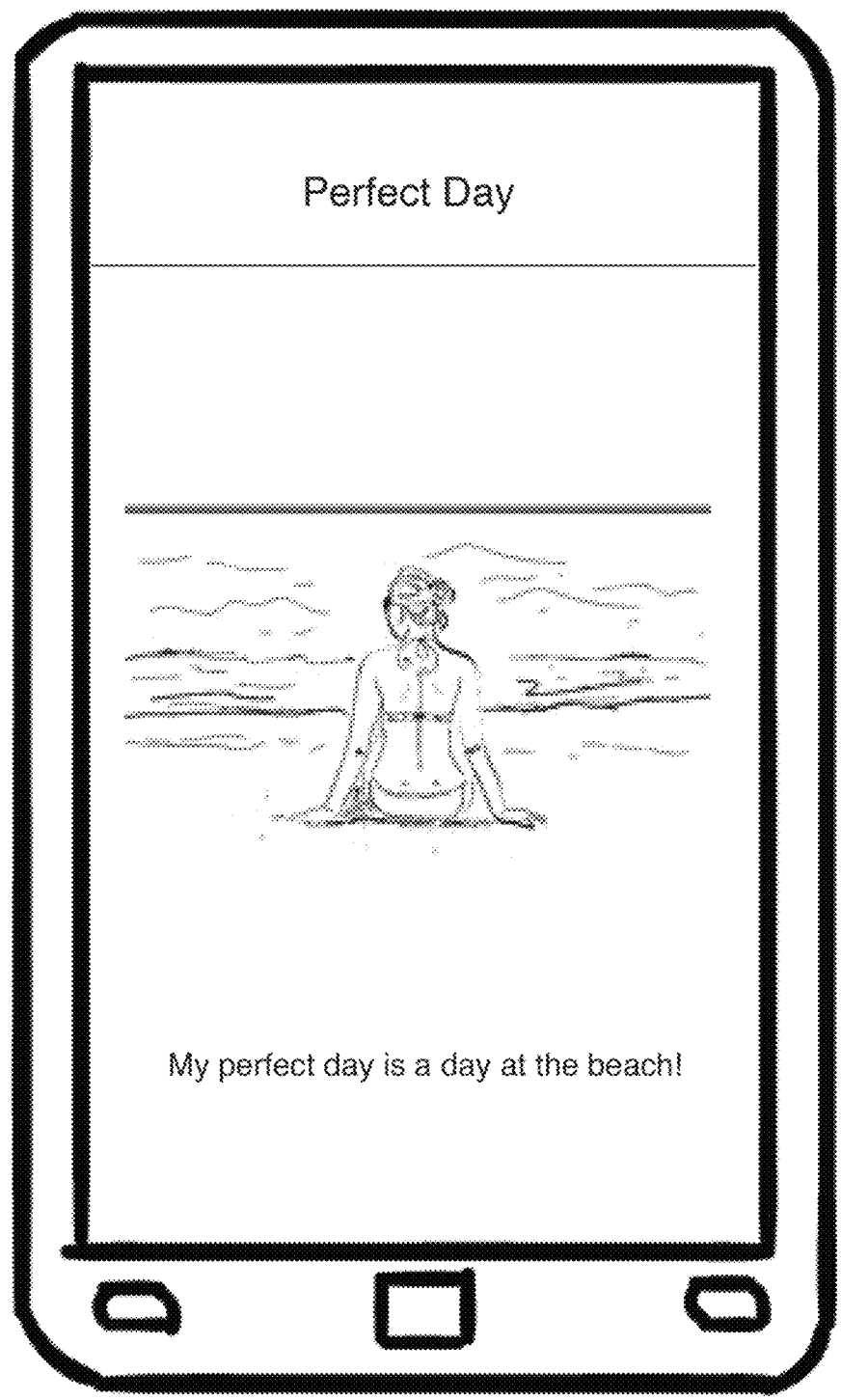
FIGS. 12A and 12B show displays of potential matches' themed-based media selections with captions.
Figure 12B:
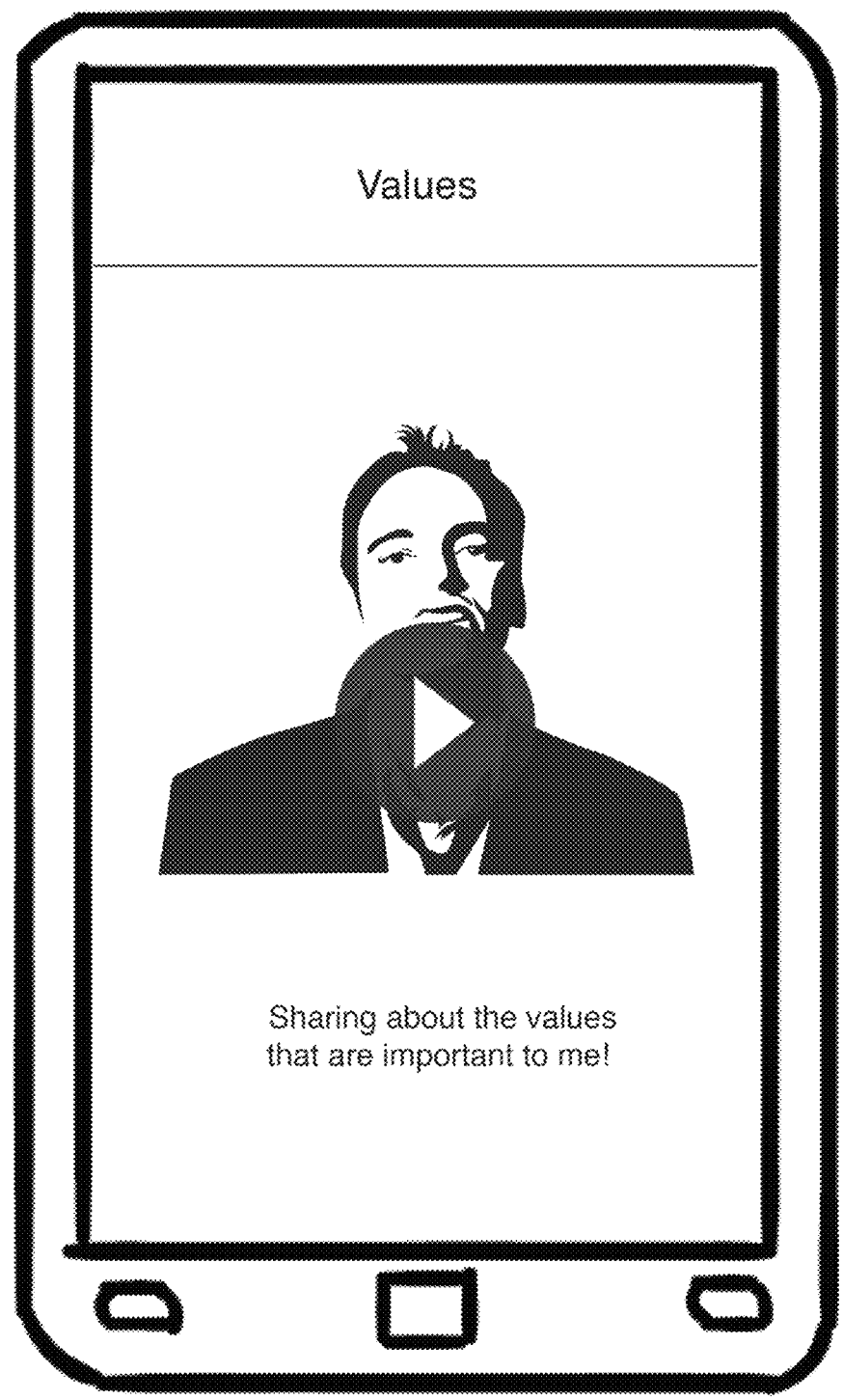

When a searching-user clicks on a search result, the database 19 serves up the media that the selected match had uploaded for that theme. For example, if a searching-user is searching the theme of "perfect day," the searching-user selects one of the people in the search results, and the database serves up the "perfect day" media that the matching user had uploaded. As well, if a searching-user selects a particular geometric shape in a full profile collage that is occupied by media for a specific theme, the database serves up that media to the searching-user. FIG. 12A gives an example of how "perfect day" media—a photograph with a caption—might be displayed in an embodiment. FIG. 12B gives an example of how "values" media—a video and a caption—might be displayed in another embodiment.

From the media display page (such as FIGS. 12A and 12B), the searching-user can move to the full multimedia profile collage of the matching user. The collage form sits on the searching-user's mobile website application or other digital application. The multimedia that fills the collage is hosted by and served from the system server.

Figure 13:
FIG. 13 shows a completed profile with the opportunity to confirm whether it is a match or not by selecting yes or no.

As in FIG. 13, the searching-user can explore the collage multimedia and themes and decide whether the searching user would like to connect and communicate with the matched user.

In another embodiment, searching functionality would not be themed-based. For example, users could be asked questions about themselves (i.e., favorite movie, favorite color) and the most well-matched users, based on their mutual preferences, could have answers displayed in a list as a means for searching-users to compare answers of potential matches, select users they like and be directed to the multimedia collages for further exploration.

Figure 14:
Figure 15A:
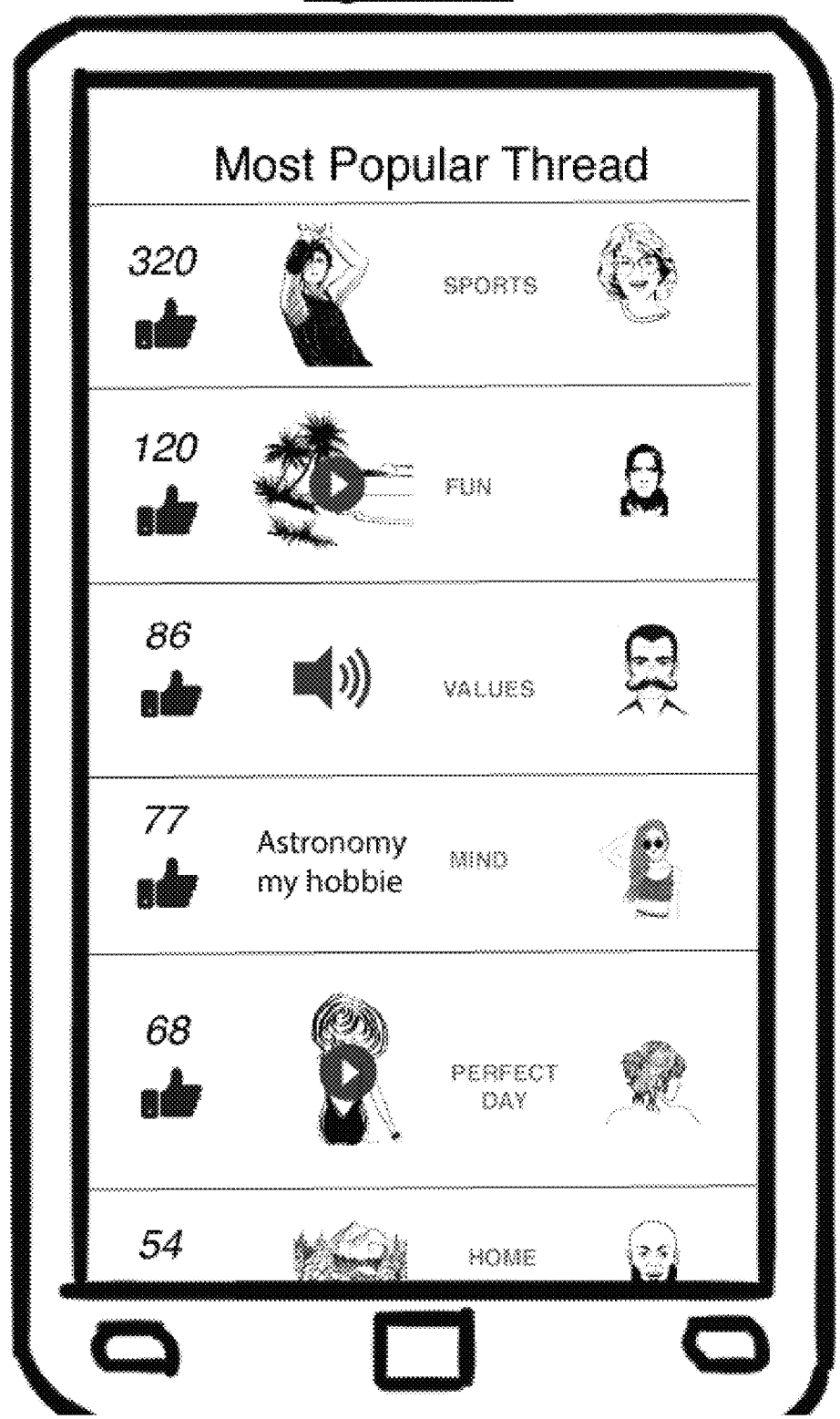
FIGS. 15A and 15B show a "thread" or feed with the most liked content.
Figure 15B:

In FIG. 14, the searching user can mark content with a "Thumbs Up" that they think is interesting, thoughtful, provocative, heartful, etc. Content with the most "Thumbs Up" appears in a "most popular" thread, as in FIG. 15, with the number of "Likes" the content has received. FIG. 15 A shows an alternative way of organizing the thread or feed. Searching users can explore content in this "most popular" thread or feed, listed by the number of "likes" or organized by themes. This provides an additional means for the searching user to discover and find people (companies, places and ideas) the user wants to connect with.

Figure 16:
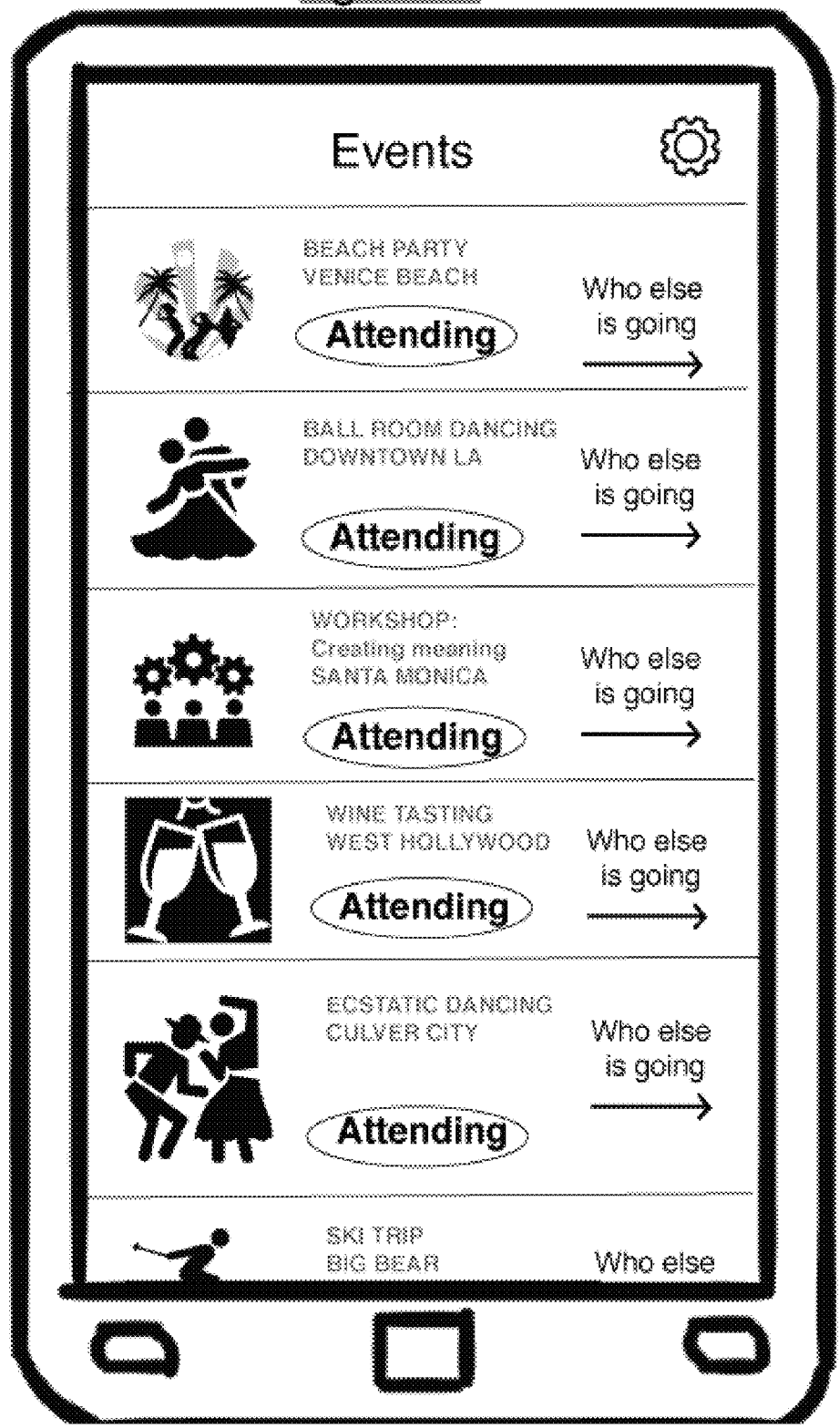
FIG. 16 shows a list of upcoming events.
Figure 17:
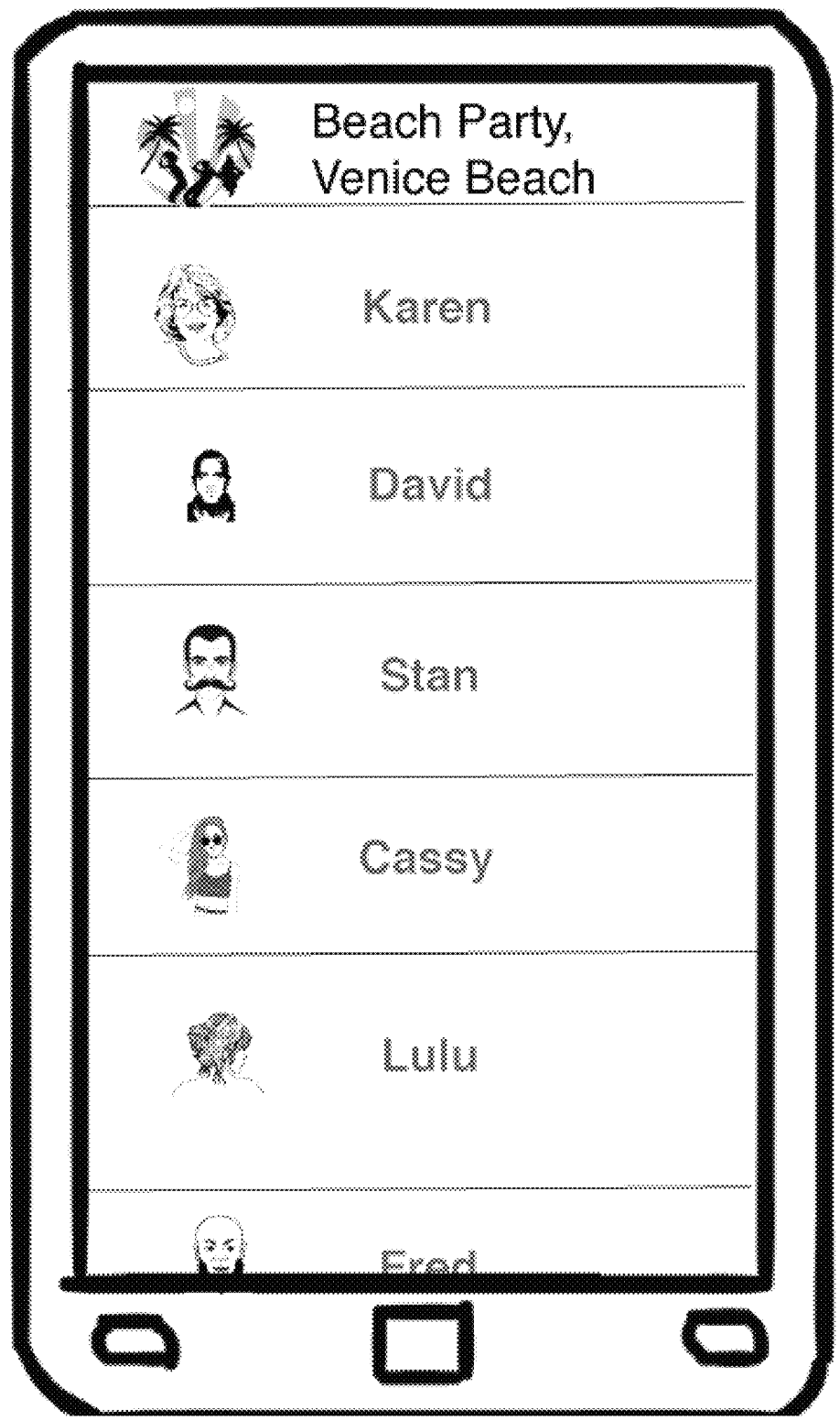
FIG. 17 shows people planning to attend an upcoming event.

Users can also connect through events they are both planning to attend. FIG. 16 shows a list of events that could be curated or user-generated. Users mark themselves as attending and can see who else, as in FIG. 17, are planning to attend the event. From this list of people planning to attend the particular event, the searching user can click through to a person's profile collage, can explore that person's collage and can send that person a message before, during or after the event they are both planning to attend.

Modifications, additions, or omissions may be made to the methods described herein without departing from the scope of the disclosure. For example, the steps may be combined, modified, or deleted where appropriate, and additional steps may be added. Additionally, the steps may be performed in any suitable order without departing from the scope of the present disclosure.

Although several embodiments have been illustrated and described in detail, it will be recognized that substitutions and alterations are possible without departing from the spirit and scope of the following claims.

What is claimed is:

1. A computer-based system for matching, comprising:
a matching server system, operatively coupled to a public network, having a database that stores user profile data for a plurality of users, wherein the user profile data comprises user information, user attributes, user preference data, and user multimedia data, wherein the user multimedia data comprises multimedia objects associated with matching themes including at least three themes selected from the group consisting of personality, perfect day, passions, work, values, mind, wellness, art, community, sports, childhood, home, ideal partner, past/future, sexuality, collaboration, current focus, dating, dreams, emoji, family, music, friendship, friends say, fun, introduction, parenting, politics, spirituality, and relationship style, and wherein the matching server system is configured to provide user matches to a searching user based on the matching themes by:
providing to the searching user the matching themes that may be relevant to the searching user to identify one or more matches from the users,
responding to a selected theme, the selected theme comprising the searching user's selection of at least one of the matching themes, by identifying from the database matches, where the matches comprise a plurality of users having a multimedia response for the selected theme,
filtering matches by comparing the searching user's preference data, attributes or information with the preference data, attributes or information for matches and selecting filtered matches based on compatibility of the searching user's preference data, attributes or information and matches' preference data, attributes or information,
providing filtered matches to the searching user by providing the multimedia response of at least one of the filtered matches to the searching user,
responding to the searching user's selection of a filtered match by providing the full multimedia collage profile of the selected filtered match to the user,
providing to the user the option with any of selected filtered matches of: requesting a connection/chat with any of the filtered matches, saving any of the selected filtered matches, blocking any of the selected filtered matches, giving a thumbs up or like to the filtered match's multimedia response or providing a comment on a selected filtered match's multimedia response for the selected theme.

2. The computer-based system for matching of claim 1, wherein at least one of the matching themes comprises an event to facilitate an in-person meeting between a searching user and a match, wherein the searching user's selection of at least one of the matching themes comprises selecting the event based on the searching user's interest in the event, wherein the filtering matches further comprises filtering based on the matches' interest in the event.

3. The computer-based system for matching of claim 1, wherein the user multimedia data further comprises geographic shapes.

4. The computer-based system for matching of claim 1, wherein the user multimedia data further comprises a user application multimedia collage.

5. The computer-based system for matching of claim 1, wherein the comment provides an indication of the searching user's preference for a selected filtered match's multimedia response, wherein providing a comment comprises whether the user likes or does not like a selected filtered match's multimedia response or selecting one of a plurality of preselected indictors indicating a user's preference for a selected filtered match's multimedia response, or providing a comment about the selected filtered match's multimedia response.

6. The computer-based system for matching of claim 1, wherein providing filtered matches to the searching user further comprises assigning a plurality of the matches a numerical ranking match number based on the compatibility of the searching user's preference data and matches' preference data, and providing filtered matches based on the numerical ranking match number.

7. The computer-based system for matching of claim 1, further comprising notifying a match of a requested connection and providing access to a portion of the searching user's profile data, and allowing communication between the match and the selected user if the match requests connection with the searching user.

8. The computer-based system for matching of claim 1, wherein a searching user can communicate with a match if the match has requested connection with the searching user.

9. A non-transitory computer-readable medium comprising instructions that, when executed by a processor, are configured to:
provide a database that stores user profile data for a plurality of users, wherein the user profile data comprises user information, user attributes, user preference data, and user multimedia data, wherein the user multimedia data comprises multimedia objects associated with matching themes including at least three themes selected from the group consisting of personality, perfect day, passions, work, values, mind, wellness, art, community, sports, childhood, home, ideal partner, past/future, sexuality, collaboration, current focus, dating, dreams, emoji, family, music, friendship, friends say, fun, introduction, parenting, politics, spirituality, and relationship style, and wherein the matching server system is configured to provide user matches to a searching user based on the matching themes by:
providing to the searching user the matching themes that may be relevant to the searching user to identify one or more matches from the users,
responding to a selected theme, the selected theme comprising the searching user's selection of at least one of the matching themes, by identifying from the database matches, where the matches comprise a plurality of users having a multimedia response for the selected theme,
filtering matches by comparing the searching user's preference data, attributes or information with the preference data, attributes or information for matches and selecting filtered matches based on compatibility of the searching user's preference data, attributes or information and matches' preference data, attributes or information,
providing filtered matches to the searching user by providing the multimedia response of at least one of the filtered matches to the searching user,
responding to the searching user's selection of a filtered match by providing the full multimedia collage profile of the selected filtered match to the user,
providing to the user the option of one or more: requesting a connection/chat with any of selected filtered matches, saving any of the selected filtered matches, blocking any of the selected filtered matches, giving a thumbs up or like to the filtered match's multimedia response or providing a comment on a selected filter match's multimedia response for the selected theme.

10. The non-transitory computer-readable medium of claim 9, wherein the matching themes comprises an event to facilitate an in-person meeting between a searching user and a match, wherein the searching user's selection of at least one of the matching themes comprises selecting the event based on the searching user's interest in the event, wherein the filtering matches further comprises filtering based on the matches' interest in the event.

11. The non-transitory computer-readable medium of claim 9, wherein the user multimedia data further comprises geographic shapes.

12. The non-transitory computer-readable medium of claim 9, wherein the user multimedia data further comprises a user application multimedia collage.

13. The non-transitory computer-readable medium of claim 9, wherein the comment provides an indication of the searching user's preference for a selected filtered match's multimedia response, wherein providing a comment comprises whether the user likes or does not like a selected filtered match's multimedia response or selecting one of a plurality of preselected indictors indicating a user's preference for a selected filtered match's multimedia response, or providing a comment about the selected filtered match's multimedia response.

14. The non-transitory computer-readable medium of claim 9, the providing filtered matches to the searching user further comprises assigning a plurality of the matches a numerical ranking match number based on the compatibility of the searching user's preference data and matches' preference data, and providing filtered matches based on the numerical ranking match number.

15. The non-transitory computer-readable medium of claim 9, further comprising notifying a match of a requested connection and providing access to a portion of the searching user's profile data, and
allowing communication between the match and the selected user if the match requests connection with the searching user.

16. The non-transitory computer-readable medium of claim 9, wherein a searching user can communicate with a match if the match has requested connection with the searching user.

17. A computer-based system for matching, comprising:
a matching server system, operatively coupled to a public network, having a database that stores listing profile data for a plurality of listings, wherein the listing profile data comprises listing information, listing attributes, and listing multimedia data, wherein the listing multimedia data comprises multimedia objects associated with matching themes including at least three themes selected from the group consisting of personality, perfect day, passions, work, values, mind, wellness, art, community, sports, childhood, home, ideal partner, past/future, sexuality, collaboration, current focus, dating, dreams, emoji, family, music, friendship, friends say, fun, introduction, parenting, politics, spirituality, and relationship style, and wherein the matching server system is configured to provide user matches to a searching user based on the matching themes by:
providing to the searching user the matching themes that may be relevant to the searching user to identify one or more matches from the listings,
responding to a selected theme, the selected theme comprising the searching user's selection of at least one of the matching themes, by identifying from the database matches, where the matches comprise a plurality of users having a multimedia response for the selected theme,
filtering matches by comparing the searching user's preference data, attributes or information with the attributes or information for matches and selecting filtered matches based on compatibility of the searching user's preference data attributes or information and the matches' attributes or information,
providing filtered matches to the searching user by providing the multimedia response of at least one of the filtered matches to the searching user,
responding to the searching user's selection of a filtered match by providing the full multimedia collage profile of the selected filtered match to the user, providing to the user the option of one or more of: requesting a connection/chat with any of selected filtered matches, saving any of the selected filtered matches, blocking any of the selected filtered matches, giving a thumbs up or like to the filtered match's multimedia response or providing a comment on a selected filter match's multimedia response for the selected theme.

18. The computer-based system for matching of claim 17, wherein the listing multimedia data further comprises geographic shapes.

19. The computer-based system for matching of claim 17, wherein the listing multimedia data further comprises a listing application multimedia collage.

* * * * *